US012574449B2

(12) United States Patent
Lin

(10) Patent No.: US 12,574,449 B2
(45) Date of Patent: Mar. 10, 2026

(54) OPERATION METHOD FOR AN ELECTRONIC DEVICE AND AN ELECTRONIC DEVICE CAPABLE OF PERFORMING AN ADVANCED LINE CODING

(71) Applicant: SK hynix Inc., Icheon-si (KR)

(72) Inventor: Wen Jyh Lin, Zhubei City (TW)

(73) Assignee: SK hynix Inc., Icheon-si (KR)

( * ) Notice: Subject to any disclaimer, the term of this patent is extended or adjusted under 35 U.S.C. 154(b) by 272 days.

(21) Appl. No.: 18/481,824

(22) Filed: Oct. 5, 2023

(65) Prior Publication Data

US 2024/0121326 A1    Apr. 11, 2024

Related U.S. Application Data

(60) Provisional application No. 63/415,166, filed on Oct. 11, 2022.

(30) Foreign Application Priority Data

May 15, 2023    (TW) .................................. 112117920

(51) Int. Cl.
*H04L 69/22*        (2022.01)
*H04L 69/08*        (2022.01)
*H04L 69/322*       (2022.01)

(52) U.S. Cl.
CPC .............. *H04L 69/22* (2013.01); *H04L 69/08* (2013.01); *H04L 69/322* (2013.01)

(58) Field of Classification Search
None
See application file for complete search history.

(56) References Cited

U.S. PATENT DOCUMENTS

| 5,579,476 | A | 11/1996 | Cheng et al. | |
| 6,415,313 | B1 * | 7/2002 | Yamada | H04L 47/19 |
| | | | | 709/200 |
| 6,880,111 | B2 | 4/2005 | Fanning | |
| 7,376,917 | B1 | 5/2008 | Lazarut et al. | |
| 8,644,148 | B2 * | 2/2014 | Balandin | H04L 47/39 |
| | | | | 370/231 |

(Continued)

FOREIGN PATENT DOCUMENTS

| KR | 1020140091719 A | 7/2014 |
| WO | 2022078426 A1 | 4/2022 |

*Primary Examiner* — Melvin H Pollack

(74) *Attorney, Agent, or Firm* — WILLIAM PARK AND ASSOCIATES LTD.

(57) ABSTRACT

Electronic device and operation method for an electronic device are provided. In the electronic device, a specific number of protocol data units (PDUs) are received as a PDU block to be transmitted. The PDU block includes at least one PDU belonging to a control PDU category. A control block is generated according to the PDU block by reordering, wherein the control block includes a header being placed before all PDUs of the PDU block and indicating a control block category; in the control block, any PDU belonging to the control PDU category in the PDU block is placed after the header and before any PDU belonging to a data PDU category in the PDU block. The control block is transmitted through the electronic device to another electronic device according to an advanced line encoding having an improved effective data rate as compared to 8b/10b encoding.

20 Claims, 17 Drawing Sheets

(56) References Cited

U.S. PATENT DOCUMENTS

| | | | |
|---|---|---|---|
| 8,830,877 B2 * | 9/2014 | Jin | H04L 1/1819 |
| | | | 370/332 |
| 9,622,111 B2 * | 4/2017 | Park | H04W 68/025 |
| 9,727,501 B2 * | 8/2017 | Gowravaram | G06F 13/28 |
| 9,998,890 B2 * | 6/2018 | Marko | H04W 4/20 |
| 10,039,099 B2 * | 7/2018 | Sato | H04W 72/23 |
| 10,075,566 B2 * | 9/2018 | Lee | H04L 69/22 |
| 10,154,402 B2 * | 12/2018 | Agiwal | H04W 4/70 |
| 10,254,972 B2 | 4/2019 | Iwai et al. | |
| 10,534,034 B2 | 1/2020 | Froelich et al. | |
| 10,587,362 B2 * | 3/2020 | Rico Alvarino | H04L 1/0057 |
| 10,606,710 B2 | 3/2020 | Kim et al. | |
| 10,630,410 B2 * | 4/2020 | Parkvall | H04L 65/1023 |
| 10,686,472 B2 * | 6/2020 | Hosseini | H03M 13/091 |
| 10,700,810 B2 * | 6/2020 | Pandey | H04L 1/0041 |
| 10,812,229 B2 * | 10/2020 | Han | H04L 1/0041 |
| 10,834,661 B2 * | 11/2020 | Joseph | H04W 40/248 |
| 10,873,429 B1 | 12/2020 | Kwon et al. | |
| 11,070,259 B2 * | 7/2021 | Manolakos | G01S 5/0218 |
| 11,336,445 B2 | 5/2022 | Anslot et al. | |
| 11,419,004 B2 * | 8/2022 | Ramos | H04W 72/569 |
| 11,444,721 B2 * | 9/2022 | Li | H04L 1/0061 |
| 11,546,087 B2 | 1/2023 | Jeong et al. | |
| 11,687,420 B2 | 6/2023 | Lin et al. | |
| 11,722,469 B2 | 8/2023 | Kravitz et al. | |
| 11,770,844 B2 * | 9/2023 | Zhou | H04L 1/1819 |
| 11,847,459 B2 * | 12/2023 | Agarwal | G06F 12/0815 |
| 11,943,053 B2 * | 3/2024 | Chen | H04L 69/22 |
| 12,237,919 B2 * | 2/2025 | Zheng | H04L 1/0009 |
| 12,356,201 B2 * | 7/2025 | Wei | H04W 72/0446 |
| 12,363,043 B2 * | 7/2025 | Mate | H04L 65/65 |
| 12,396,023 B2 * | 8/2025 | Yi | H04L 27/26025 |
| 12,414,172 B2 * | 9/2025 | Gupta | G06F 9/54 |
| 2008/0285678 A1 | 11/2008 | Karaki | |
| 2010/0165896 A1 | 7/2010 | Gong et al. | |
| 2011/0026656 A1 | 2/2011 | Gregie et al. | |
| 2011/0066921 A1 | 3/2011 | Blackmon et al. | |

| | | | |
|---|---|---|---|
| 2011/0076953 A1 | 3/2011 | Macrae | |
| 2012/0120960 A1 | 5/2012 | Nishioka | |
| 2013/0061099 A1 | 3/2013 | Radulescu | |
| 2013/0179628 A1 | 7/2013 | Sekiya | |
| 2013/0227509 A1 | 8/2013 | Chang et al. | |
| 2015/0180484 A1 | 6/2015 | Portmann et al. | |
| 2016/0246667 A1 | 8/2016 | Kumar Rao | |
| 2016/0364309 A1 | 12/2016 | Park et al. | |
| 2017/0093521 A1 | 3/2017 | Wang et al. | |
| 2017/0220517 A1 | 8/2017 | Khan et al. | |
| 2017/0286357 A1 | 10/2017 | Chellappan et al. | |
| 2018/0132263 A1 * | 5/2018 | Nuggehalli | H04W 72/569 |
| 2019/0052736 A1 * | 2/2019 | Turtinen | H04L 69/22 |
| 2019/0182809 A1 * | 6/2019 | Liu | H04L 1/0045 |
| 2019/0191330 A1 * | 6/2019 | Dao | H04L 12/4633 |
| 2020/0081646 A1 | 3/2020 | Byun et al. | |
| 2020/0082891 A1 | 3/2020 | Lee et al. | |
| 2020/0192856 A1 | 6/2020 | Lee et al. | |
| 2020/0356519 A1 | 11/2020 | Ballantyne et al. | |
| 2020/0379833 A1 | 12/2020 | Hsiao et al. | |
| 2022/0294476 A1 | 9/2022 | Seol et al. | |
| 2023/0056001 A1 | 2/2023 | Lin | |
| 2023/0133677 A1 * | 5/2023 | Sun | H04L 1/0067 |
| | | | 370/328 |
| 2023/0188256 A1 | 6/2023 | Yu et al. | |
| 2023/0239073 A1 | 7/2023 | Bharadwaj et al. | |
| 2023/0269311 A1 * | 8/2023 | Liu | H04B 7/15 |
| | | | 370/235 |
| 2023/0377618 A1 | 11/2023 | Lin | |
| 2023/0396360 A1 | 12/2023 | Zhang et al. | |
| 2024/0014943 A1 | 1/2024 | Kuo et al. | |
| 2024/0089236 A1 * | 3/2024 | Li | H04L 63/0263 |
| 2024/0121326 A1 | 4/2024 | Lin | |
| 2024/0340322 A1 * | 10/2024 | Bouazizi | H04L 65/65 |
| 2024/0397399 A1 | 11/2024 | Gupta et al. | |
| 2025/0047400 A1 * | 2/2025 | Peyla | H04H 20/423 |
| 2025/0097954 A1 * | 3/2025 | Sengupta | H04L 1/0057 |
| 2025/0142440 A1 * | 5/2025 | Lee | H04W 36/362 |
| 2025/0158765 A1 * | 5/2025 | Echigo | H04L 5/0048 |

* cited by examiner

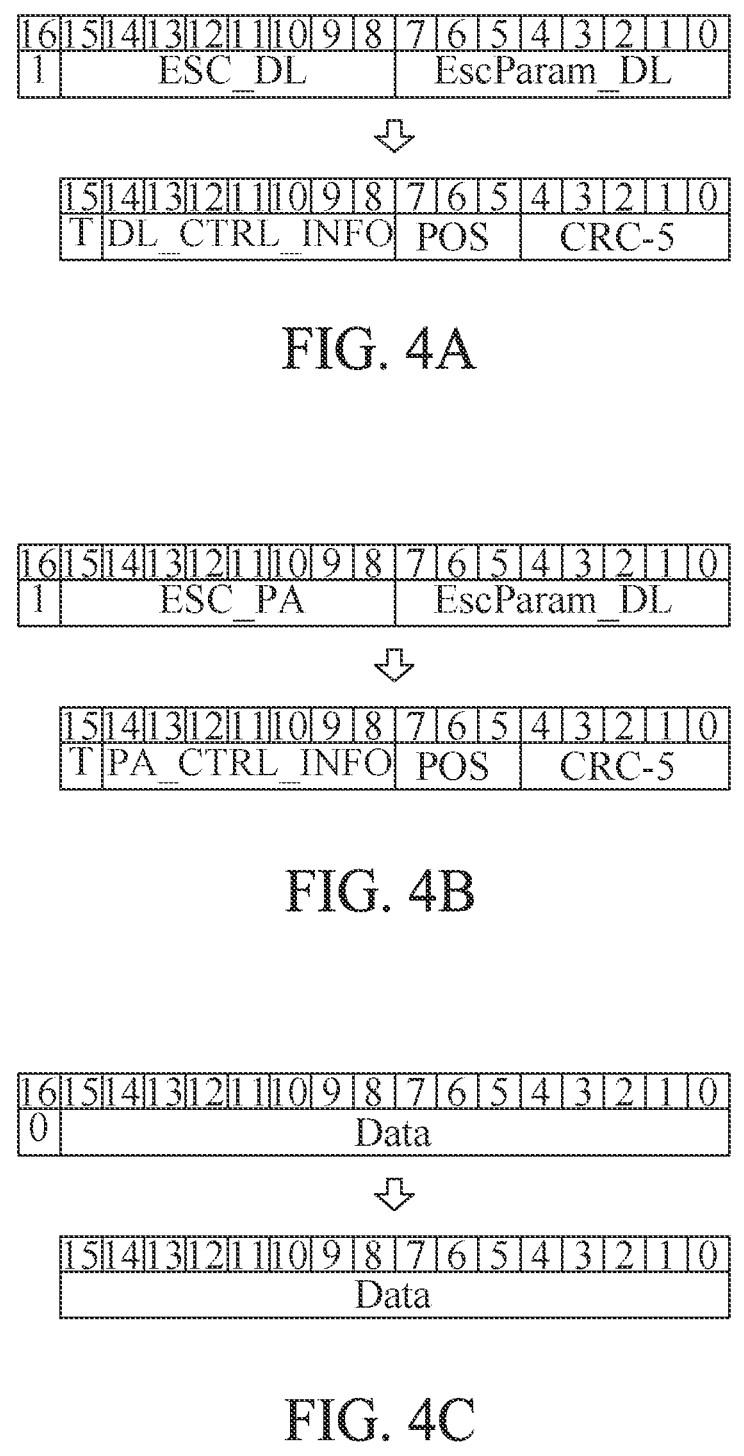

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 1 | ESC_DL | | | | | | | | EscParam_DL | | | | | | | |

⇩

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| T | DL_CTRL_INFO | | | | | | | POS | | | CRC-5 | | | | |

FIG. 4A

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 1 | ESC_PA | | | | | | | | EscParam_DL | | | | | | | |

⇩

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| T | PA_CTRL_INFO | | | | | | | POS | | | CRC-5 | | | | |

FIG. 4B

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 0 | Data | | | | | | | | | | | | | | | |

⇩

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| Data | | | | | | | | | | | | | | | |

OPERATION METHOD FOR AN ELECTRONIC DEVICE AND AN ELECTRONIC DEVICE CAPABLE OF PERFORMING AN ADVANCED LINE CODING

CROSS-REFERENCE TO RELATED APPLICATION

This non-provisional application claims the benefit under 35 U.S.C. § 119(e) of U.S. Provisional Patent Application No. 63/415,166 filed on Oct. 11, 2022, and claims priority under 35 U.S.C. § 119(a) to Taiwanese Patent Application No. 112117920 filed on May 15, 2023, in the Taiwan Intellectual Property Office, the entire contents of which are hereby incorporated by reference.

BACKGROUND OF THE INVENTION

1. Field of the Invention

The present disclosure relates to an electronic device and a method therefor, and in particular to methods for an interconnection protocol capable of performing an advanced line coding, a controller therefor, and an electronic device such as a host device and a storage device thereof.

2. Description of the Related Art

The Mobile Industry Processor Interface (MIPI) alliance developed interconnection protocol technology, for example, MIPI M-PHY specification associated with a physical layer and MIPI UniPro specification associated with a Unified Protocol (UniPro), for interconnection from one chip to another inside the mobile devices or those affected by the mobile devices in order to implement higher transmission speeds and low power consumption operations. On the other hand, the Joint Electron Device Engineering Council (JEDEC), using the MIPI M-PHY specification and the MIPI UniPro specification, launched a high-performance non-volatile memory standard that is referred to as Universal Flash Storage (UFS). The UFS standard realizes gigabit-level high-speed transmissions and low-power operations, and provides the functionality and expandability required for advanced mobile systems (for example, computing devices such as smartphones, tablet computers, multimedia devices, and wearable devices) to facilitate rapid adoption by the industry.

A system implemented according to the UFS standard includes a local host and a remote device, wherein the local host may be a computing device and the remote device may be a storage device implemented by a non-volatile memory, for example. A bidirectional link is established between the host and the device, and this link in between can be configured with multiple lanes in either of the transmission directions. Each of the host and the device can be implemented with a physical interface according to the M-PHY specification and a link controller according to the UniPro specification.

For all M-PHY symbols transmitted over the link, the physical interface is required to apply a specified line coding (or symbol coding) technique referred to as "8b10b" or "8b/10b" coding defined in the M-PHY specification for DC balance. The link controller also utilizes the symbol encoding technique that UniPro requires for M-PHY correspondingly. In this well-known 8b10b coding scheme, every byte is converted to ten bits and the 8b10b coding has 20% overhead accordingly.

BRIEF SUMMARY OF THE INVENTION

In the present disclosure, technologies for facilitating an interconnection protocol capable of performing a line coding scheme having an improved effective data rate are provided, and are suitable for a first electronic device capable of linking to a second electronic device according to the interconnection protocol.

Embodiments of an operation method for an electronic device are provided. The electronic device is operable to communicate with another electronic device according to an interconnection protocol. The operation method comprises the following. At a controller of the electronic device, a specific number of protocol data units (PDUs) are received as a PDU block to be transmitted by using an advanced line encoding having an improved effective data rate as compared to 8b/10b encoding, wherein the PDU block includes at least one PDU belonging to a control PDU category. At the controller, a control block is generated according to the PDU block by reordering the PDUs of the PDU block, wherein the control block includes a header being placed before all PDUs of the PDU block and indicating a control block category; the PDUs of the PDU block are reordered such that in the control block, any PDU belonging to the control PDU category in the PDU block is placed after the header and is placed before any PDU belonging to a data PDU category in the PDU block. The control block is transmitted through the electronic device to the another electronic device according to the advanced line encoding.

Embodiments of an electronic device are provided. The electronic device is operable to communicate with another electronic device according to an interconnection protocol. The electronic device comprises a controller and an interface circuit. The controller is capable of receiving a specific number of protocol data units (PDUs) as a PDU block to be transmitted by using an advanced line encoding having an improved effective data rate as compared to 8b/10b encoding, wherein the PDU block includes at least one PDU belonging to a control PDU category. The controller is capable of generating a control block according to the PDU block, wherein the control block includes a header being placed before all PDUs of the PDU block and indicating a control block category. The controller is capable of reordering the PDUs of the PDU block in generation of the control block such that in the control block, any PDU belonging to the control PDU category in the PDU block is placed after the header and is placed before any PDU belonging to a data PDU category in the PDU block. The interface circuit is capable of transmitting the control block to the another electronic device according to the advanced line encoding.

In some embodiments of the operation method or the electronic device, the advanced line encoding is based on a 128b/130b line encoding, 128b/132b line encoding, 256b/258b line encoding, or 256b/260b line encoding.

In some embodiments of the operation method or the electronic device, the PDU block has a PDU belonging to the control PDU category obtained by conversion of a control symbol from a data link layer of the electronic device.

In some embodiments of the operation method or the electronic device, the control symbol from the data link layer of the electronic device is a data link layer control symbol according to a Unified Protocol (UniPro).

In some embodiments of the operation method or the electronic device, the PDU block has a PDU belonging to the control PDU category obtained by conversion of a control symbol of a physical adapter layer of the electronic device.

In some embodiments of the operation method or the electronic device, the control symbol of the physical adapter layer of the electronic device is a physical adapter control protocol (PACP) control symbol according to a Unified Protocol (UniPro).

In some embodiments of the operation method or the electronic device, a PDU belonging to the control PDU category in the PDU block includes a position field indicating a position of the PDU in the PDU block.

In some embodiments of the operation method or the electronic device, a first PDU belonging to the control PDU category in the PDU block includes a link list field indicating whether there is a second PDU belonging to the control PDU category in the PDU block and being placed after the first PDU in the control block.

In some embodiments of the operation method or the electronic device, the controller is capable of receiving a specific number of another PDUs as another PDU block to be transmitted by using the advanced line encoding, wherein all PDUs of the another PDU block belong to the data PDU category; the controller is capable of generating a data block according to the another PDU block, wherein the data block includes a header and all PDUs of the another PDU block, the header of the data block is placed before all PDUs of the another PDU block and indicates a data block category, and the interface circuit is capable of transmitting the data block to the another electronic device according to the advanced line encoding.

In some embodiments of the operation method or the electronic device, the controller is capable of transmitting at least one ordered set to the another electronic device to start a burst transmission, wherein the controller transmits the control block after starting the burst transmission.

Various embodiments are provided below according to the technologies, for example, methods for an interconnection protocol capable of performing advanced line coding, controllers, and electronic devices.

BRIEF DESCRIPTION OF THE DRAWINGS

FIG. 4A is a schematic diagram illustrating an example of ESC_DL related protocol data unit (PDU) mapping.

FIG. 4B is a schematic diagram illustrating an example of ESC_PA related PDU mapping.

FIG. 4C is a schematic diagram illustrating an example of DL or PACP data PDU mapping.

FIG. 5A is a schematic diagram illustrating examples of DL TCx frame mapping result for PA_ALE_SAP.

FIG. 5D is a schematic diagram illustrating an example of PACP frame mapping result for PA_ALE_SAP.

DETAILED DESCRIPTION OF THE INVENTION

Figure 1:
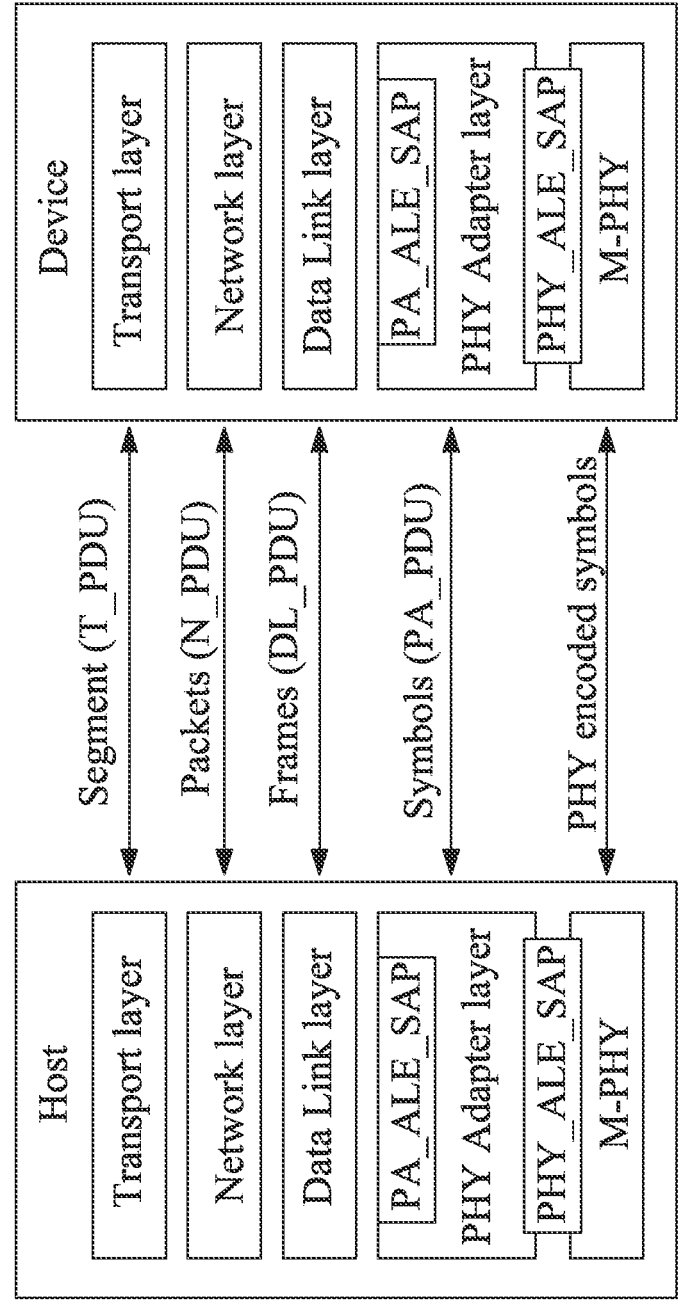
FIG. 1 is a schematic diagram illustrating new service access points (SAPs) in a UFS system to conduct advanced line encoding (ALE) according to an embodiment of the present disclosure.

To facilitate understanding of the object, characteristics and effects of this present disclosure, embodiments together with the attached drawings for the detailed description of the present disclosure are provided.

Currently, the UniPro and M-PHY specifications adopted by the UFS standard utilize 8b10b coding scheme. The UniPro specification was influenced by 8b/10b coding scheme. For example, the frame structures of a data link (DL) layer and a physical adapter (PA) layer of the UniPro stack are associated with 8b/10b coding scheme. Specifically, the structure of DL frame or PA Control Protocol (PACP) frame of the UniPro specification has control symbol identifier ESC_DL or ESC_PA leaded, respectively. The UniPro specification has statements for ESC_PA/ESC_DL mapping as follows. For all M-PHY symbols transmitted over the link, the M-PHY 8b10b encoding/decoding services shall be applied. PA PA_PDU symbols require mapping to as follows. A data PA_PDU is mapped to <PA_PDU[15:8], PA_PDU[7:0]>. A DL escaped PA_PDU is mapped to M-PHY symbols <MK0, PA_PDU[7:0]>. A PA escaped PA_PDU is mapped to M-PHY symbols <MK1, PA_PDU [7:0]>. On the other hand, the M-PHY specification defines M-PHY control symbols, which are special symbols that do not occur in the data symbol set and can be used for control features. In particular, M-PHY control symbols MARKER0 (MK0), MARKER1 (MK1) are all K-Code (control symbols) in 8b/10b coding scheme.

As compared to 8b/10b coding scheme, it is noted that 128b/130b or 128b/132b coding scheme and so on has better data throughput result. However, 128b/130b or 128b/132b coding scheme does not have K-Code for the receiver to perform symbol alignment and symbol lock operation. To conduct one of these new coding schemes in UFS, symbol alignment and symbol lock issues are addressed.

In the present disclosure, the inventor proposes an interconnection protocol, which can be derived from the UFS standard, with an advanced line coding scheme, rather than 8b/10b coding scheme. The advanced line coding scheme hereafter is referred to as Advance Line Encode or advanced line encoding (ALE) which indicates a coding scheme having an improved effective data rate as compared to 8b/10b coding scheme, such as a 128b/130b, 128b/132b, 256b/258b, or 256b/260b coding scheme, or so on, with reduced overhead, as compared to 8b/10b coding scheme. In addition, new frame structure is proposed for the interconnection protocol to conduct or realize the advanced line encoding (ALE) for improved data throughput. The interconnection protocol can also be regarded as a proposed or enhanced version of the UFS standard in the future. In order to facilitate the realization of the proposed interconnection protocol, symbol alignment and symbol lock issues are addressed with examples in the present disclosure as well. Because the ALE has a reduced overhead, the interconnection protocol is capable of facilitating enhanced data throughput.

Various embodiments are provided below for facilitating the interconnection protocol based on the ALE, and are suitable for a first electronic device capable of communicating with a second electronic device according to the interconnection protocol.

As mentioned above, the interconnection protocol with the ALE can be derived from the UFS standard. For example, a conventional UFS system includes a UFS host and a UFS device. The UFS host and the UFS device communicate each other through respective UFS Interconnect (UIC) layer including UniPro and M-PHY. Accordingly, the interconnection protocol with the ALE can be implemented and derived from architecture of the conventional UFS system by using a modified UFS system implementing a modified version of UniPro and a modified version of M-PHY for the ALE. Further, the interconnection protocol with the ALE can also be implemented in a communication system including a host and a device each having respective link layer (such as a modified version of UniPro) and respective physical layer (such as a modified version of M-PHY) both compliant with the ALE.

Referring to FIG. 1, service access points (SAPs) in a modified UFS system are illustrated to conduct advanced line encoding (ALE) according to an embodiment of the present disclosure. In this embodiment as shown in FIG. 1, either the host or device of the modified UFS system has new service access points (SAPs) associated with the facilitation of ALE in the protocol stack. For example, a PHY Adapter (PA) service access point for ALE, denoted by PA_ALE_SAP, provides services in the PA layer (L1.5). In addition, a service access point for PHY layer (e.g., M-PHY) with ALE, denoted by PHY_ALE_SAP, provides services to the PA layer. As illustrated in FIG. 1, on one side (e.g., a host) of the communication system, the layers of the UniPro, such as the transport layer to PA layer, and the PHY layer communicate with their counterparts on the peer side (e.g., a device) by using their respective protocol data units (e.g., segments (T_PDU), packets (N_PDU), frames (DL_PDU), symbols (PA_PDU), and PHY encoded symbols), wherein the PA layer and PHY layer are configured to support the ALE.

Figure 2:
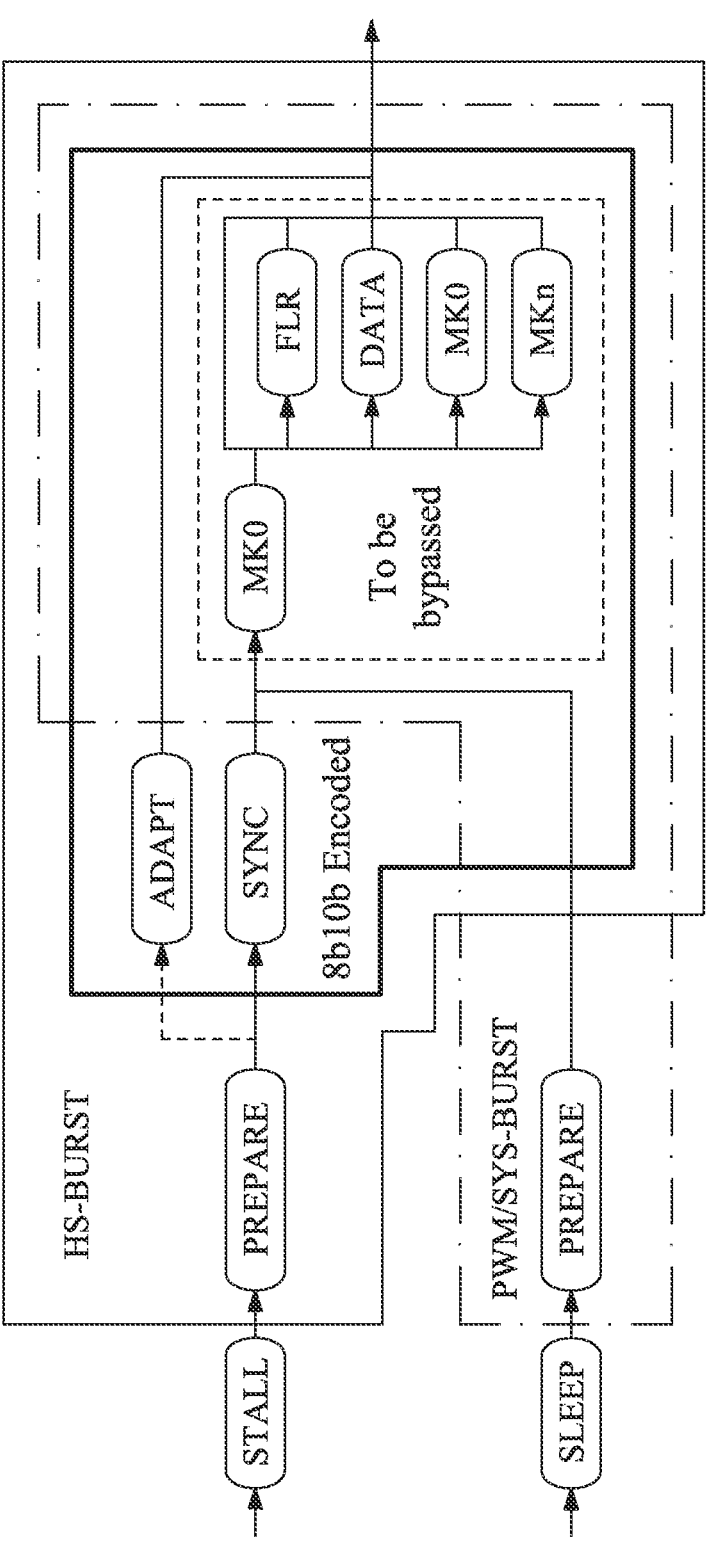
FIG. 2 is a schematic diagram illustrating modifications to M-PHY to facilitate data transmission using ALE according to an embodiment of the present disclosure.

Currently, the M-PHY (such as version 5.0) supports 8b/10b coding scheme. Referring to FIG. 2, when a modified physical layer (referred to as modified M-PHY) for the ALE is derived from the current M-PHY, it is assumed that 8b/10b coding in M-PHY can be bypassed. For example, in the implementation of the modified M-PHY, the interface such as a 64-bit Reference M-PHY MODULE Interface (RMMI) may be changed to an 80-bit advanced line encoding interface. In addition, another modified version of M-PHY can be derived from the current M-PHY and modified to be dedicated for the ALE instead of 8b/10b coding. In addition, FIG. 2 illustrates a BURST sub-state machine specified by M-PHY specification (such as version 5.0), wherein the terms such as STALL, PREPARE, ADAPT, SYNC, SLEEP, PREPARE, HS-BURST, PWM/SYS BURST, and so on are defined by the M-PHY specification, which one of ordinary skill in the art would understand accordingly, and for the sake of brevity, their details will not be repeated herein.

Figure 3:
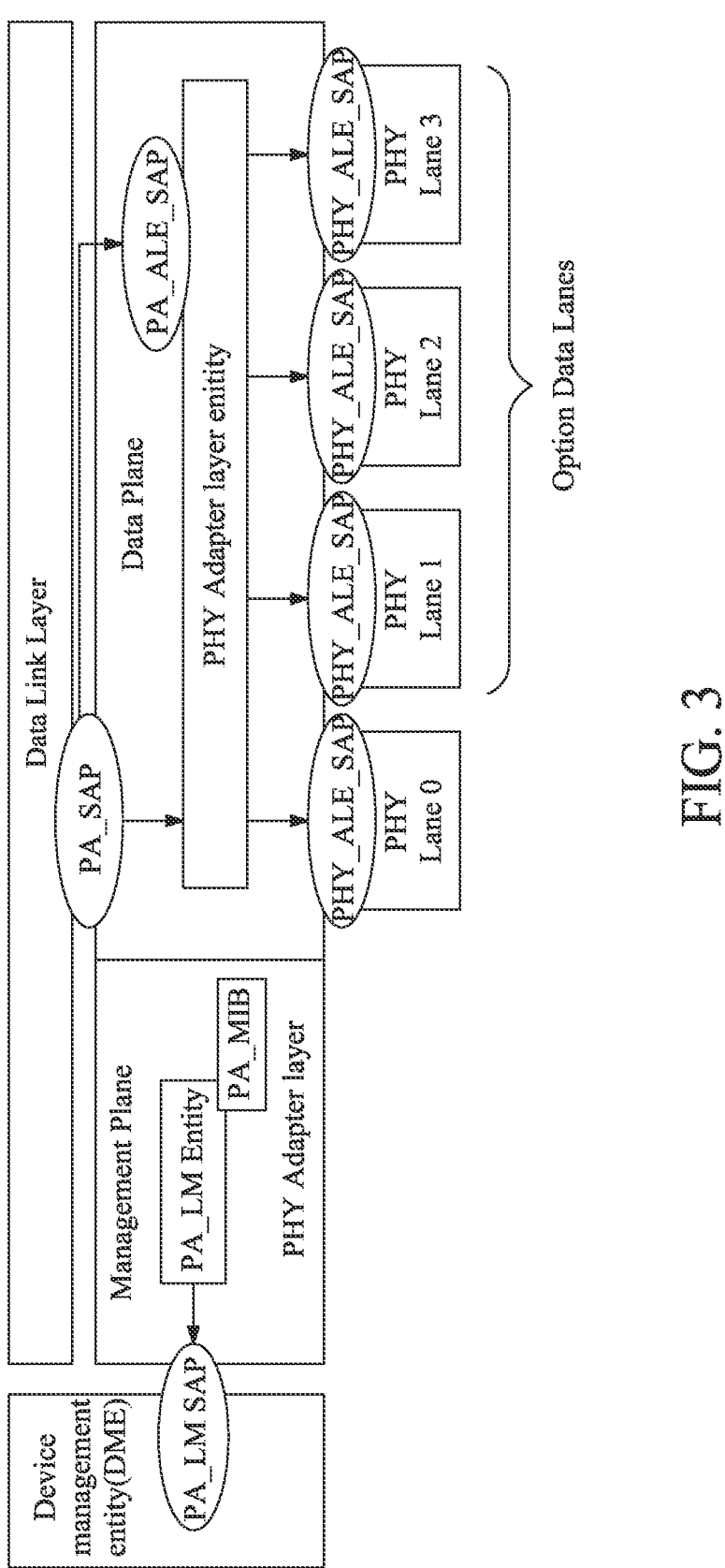
FIG. 3 is a schematic diagram of an embodiment of PHY adapter layer SAP model for ALE operations.

FIG. 3 illustrates an embodiment of PHY adapter layer SAP model for ALE operations in a schematic diagram. A modified PHY adapter (PA) layer illustrated in FIG. 3 for ALE can be derived from the PHY Adapter Layer SAP model of UniPro version 2.0. As shown in FIG. 3, a data link layer, a PHY Adapter layer (such as having PA_SAP, PHY Adapter layer entity, PA layer management (PA_LM) entity, PA Layer-specific Management Information Base (PA_MIB), PA layer management service access point (PA_LM SAP)), and a device management entity (DME) can be derived from the PHY Adapter Layer SAP model of UniPro version 2.0. As compared to the PA layer of UniPro version 2.0, the modified PA layer has the PHY Adapter (PA) service access point for ALE (PA_ALE_SAP) in the modified PA layer to provide services in the modified PA layer, especially for the PHY Adapter service access point (PA_SAP). In addition, the service access point for PHY layer with ALE (PHY_ALE_SAP) provides services to the modified PA layer, for example, the PHY Adapter layer entity. In this manner, the implementations of the modified PA layer and modified M-PHY with respect to the ALE are hidden from the data link layer. Thus, the PHY adapter layer SAP model for ALE facilitates the implementation of the interconnection protocol with the ALE and reduces its implementation complexity.

In some embodiments, the service access point PA_ALE_SAP can be implemented to perform new frame mapping. In some embodiments, the service access point PHY_ALE_SAP can be implemented to perform block management. The following provides examples of the new service access points for ALE: PA_ALE_SAP and PHY_ALE_SAP.

Regarding the service access point PA_ALE_SAP, the new frame mapping can be implemented for various types of protocol data units (PDU) that may be processed in the current PA layer, such as ESC_DL related PDU, ESC_PA related PDU, and data PDU.

In an example, PA_ALE_SAP can be implemented to perform new frame mapping for ESC_DL related PDU. An example of ESC_DL related protocol data unit (PDU) mapping is illustrated in FIG. 4A, whose upper portion shows an ESC_DL related PDU and whose lower portion shows a mapping result of the PDU in new frame structure. In 8b/10b coding scheme, the control symbol identifier ESC_DL is used for symbol alignment and its corresponding code is unique in K-Code table in the M-PHY specification for receiver decoding. In the ALE coding scheme, it is mapped to a control information (denoted by CTRL_INFO) PDU with a T tag. Specifically as shown in FIG. 4A, an ESC_DL related PDU, which includes an escaped data type (e.g., set to ESC_DL) and corresponding escaped payload data (e.g., denoted by EscParam_DL), is translated into a data link control information (denoted by DL_CTRL_INFO) PDU, wherein a T tag (or referred to as a link list field) indicates a link list in a control block and DL_CTRL_INFO indicates information for DL control symbols. A POS (position) field indicates DL_CTRL_INFO position in an ALE block, which will be described later. Each ALE block has a specific number of PDUs, such as 8 PDUs (128 bits). Optionally, the DL_CTRL_INFO PDU can end with a cyclic redundancy check (CRC) field, such as a CRC-5 field indicating using CCITT-CRC5 to cover and protect fields from T, DL_C-TRL_INFO to POS in order to enhance reliability of transmission, wherein CCITT stands for International Telegraph and Telephone Consultative Committee.

In another example, PA_ALE_SAP can be implemented to perform new frame mapping for ESC_PA related PDU. An example of ESC_PA related protocol data unit (PDU) mapping is illustrated in FIG. 4B, whose upper portion shows an ESC_PA related PDU and whose lower portion shows a mapping result of the PDU in new frame structure. In 8b/10b coding scheme, the control symbol identifier ESC_PA is used for symbol alignment and its corresponding code is unique in K-Code table in the M-PHY specification for receiver decoding. In ALE coding scheme, it is mapped to a CTRL_INFO PDU with a T tag. Specifically as shown in FIG. 4B, an ESC_PA related PDU, which includes an escaped data type (e.g., set to ESC_PA) and corresponding escaped payload data (e.g., denoted by EscParam_PA), is translated into a PA control information (denoted by PA_C-TRL_INFO) PDU, wherein T tag indicates a link list in a control block. PA_CTRL_INFO indicates information for PA control symbols. A POS (position) field indicates PA_C-TRL_INFO position in an ALE block. Each ALE block has a specific number of PDUs, such as 8 PDUs (128 bits). Optionally, the PA_CTRL_INFO PDU can end with a cyclic redundancy check (CRC) field, such as CRC-5 indicating CCITT-CRC5 to cover and protect fields from T, PA_C-TRL_INFO to POS.

In another example, PA_ALE_SAP can be implemented to perform new frame mapping for data PDU. An example of DL or PACP data protocol data unit (PDU) mapping is illustrated in FIG. 4C, whose upper portion shows a DL or PACP data PDU and whose lower portion shows a mapping result of the PDU. The DL or PACP data PDU is directly mapped to a data PDU for the ALE coding scheme without changes except for removal of Bit 16 of the DL or PACP data PDU because no control symbol (K-Code) in data PDUs.

Figure 5A:
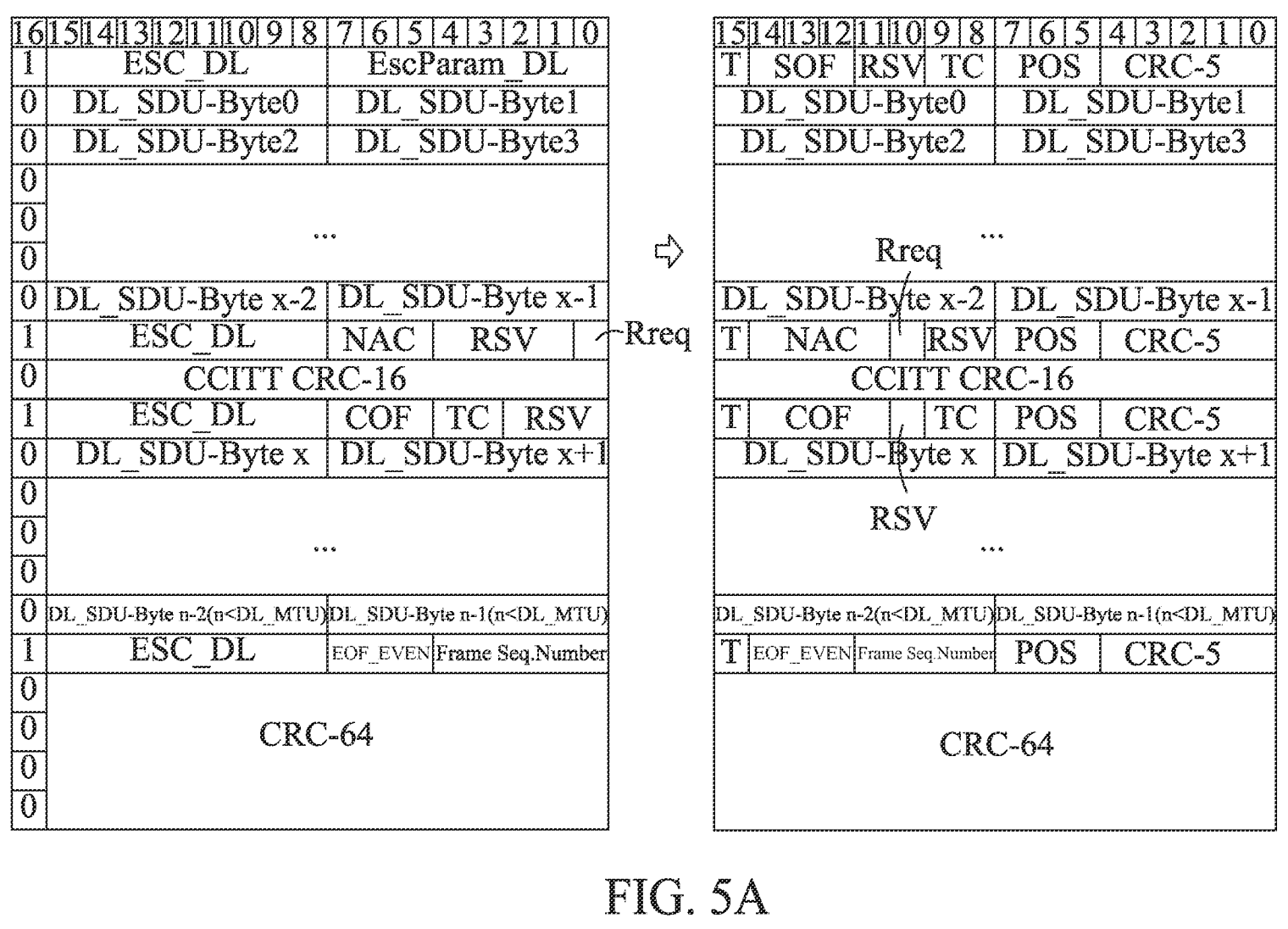

FIG. 5A illustrates further examples of DL TCx frame mapping result for PA_ALE_SAP in a schematic diagram, wherein TCx indicates a TC0 or TC1 frame as specified in the UniPro specification. A DL Frame with preemption according to the conventional version (e.g., version 2.0) of UniPro on the left side of FIG. 5A is mapped or translated into a DL Frame in a new frame structure for an advanced line encoding on the right side of FIG. 5A. Specifically, the DL frame on the left side is with an even number of DL_SDU bytes and is preempted by a NAC control frame and the continuation of the preempted frame (COF) is marked by the COF control symbol, wherein DL_SDU stands for a DL service data unit having n bytes and n is less than or equal to a Maximum Payload Length denoted by DL_MTU, as specified in the UniPro specification. For enhanced reliability consideration, in some embodiments, CRC-64 can be used during data link (DL) framing in an implementation of the interconnection protocol capable of performing the ALE, instead of CCITT CRC-16 adopted in the conventional version of UniPro for DL framing. In FIG. 5A, it indicates that PA_ALE_SAP does the PDU mapping and treats the CRC-64 value as data PDUs directly. It is noted that a CRC-64 value can be calculated by the data link layer in advance. Afterward, the data link layer sends a frame with the CRC-64 value to the PA layer for block generation for ALE.

Figures 5B, 5C:
FIG. 5B is a schematic diagram illustrating an example of DL control frame mapping result for PA_ALE_SAP.
FIG. 5C is a schematic diagram illustrating another examples of DL control frame mapping result for PA_ALE_SAP.

FIG. 5B illustrates an example of DL control frame mapping result for PA_ALE_SAP in a schematic diagram. A DL control frame for Acknowledgment and Flow Control (AFC Frame) according to the conventional version (e.g., version 2.0) of UniPro on the left side of FIG. 5B is translated into an AFC Frame in a new frame structure for an advanced line encoding on the right side of FIG. 5B.

FIG. 5C illustrates another examples of DL control frame mapping result for PA_ALE_SAP in a schematic diagram. A DL control frame for Negative Acknowledgment Control (NAC Frame) according to the conventional version (e.g., version 2.0) of UniPro on the left side of FIG. 5C is translated into a NAC Frame in a new frame structure for an advanced line encoding on the right side of FIG. 5C.

Figure 5D:
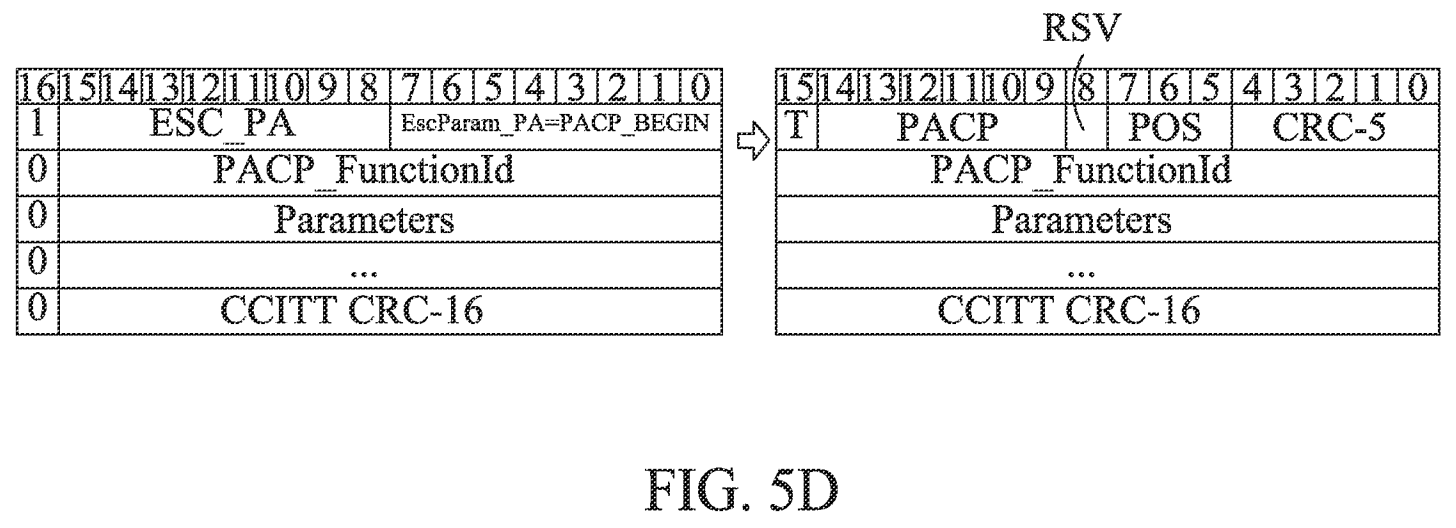

FIG. 5D illustrates an example of PACP frame mapping result for PA_ALE_SAP in a schematic diagram. A PACP frame according to the conventional version (e.g., version 2.0) of UniPro on the left side of FIG. 5D is translated into a PACP frame in a new frame structure for an advanced line encoding on the right side of FIG. 5D. In FIG. 5D, the fields or parameters, such as the escaped payload data EscParam_PA (e.g., having a value PACP_BEGIN) and a field PACP_FunctionID, for example, are set to respective values as required by the conventional UniPro specification.

In addition, control symbol types, such as SOF (Start of Frame), EOF_EVEN (End of Frame with even number of bytes), EOF_ODD (End of Frame with odd number of bytes), COF, NAC, and AFC, of the new frame structure on the right side of FIG. 5A to 5D may have specific values for the ALE.

Regarding the PDU mapping as illustrated in FIGS. 4A-4B and 5A-5D, the CRC-5 fields are optional. In addition, the bit width of POS field is variable for different implementations of ALE. An ALE block indicates a group of a specific number of PDUs to be transmitted by using communication according to an ALE and can be referred to a PDU block as well. In the above format as shown in FIGS. 4A-4B and 5A-5D, the bit width of the POS field is 3 bits for an implementation of ALE with an ALE block of 8 PDUs (or referred to as 8-PDU ALE block). In case of a 16-PDU ALE block, its POS field can be 4 bits wide and CRC-5 field will no longer be used. In theorem, a POS field of 8 bits can be used in implementations of ALE with an ALE block of up to 256 PDUs. In addition, in the stage of the PDU mapping associated with PA_ALE_SAP, the value of a link list field (T tag) or a POS field with respect to a control information PDU (such as DL_CTRL_INFO or PA_CTRL_INFO PDU) may be set to a default value (e.g., 0 or another value) temporarily. The value of the link list field (T tag) or the POS field with respect to the control information PDU is to be determined in the stage of generation of a control block by the PHY_ALE_SAP, as will be exemplified later.

Regarding the service access point PHY_ALE_SAP, the block management can be implemented to perform ALE data block generation and control block generation. In the modified M-PHY for the ALE, a unit of information for transmission according to the ALE may be a data block (or called ALE data block) or a control block (or called ALE control block), which is generated according to an ALE block. As mentioned in the examples for the PA_ALE_SAP above, an ALE block (or called a PDU block) includes a specific number of PDUs resulted from the PDU mapping by the PA_ALE_SAP, such as one or more of DL_CTRL_INFO PDU, PA_CTRL_INFO PDU, and data PDU illustrated in FIGS. 4A to 4C, respectively, or those PDUs illustrated in FIGS. 5A to 5D. The specific number of PDU of the ALE block depends on the type of the ALE coding scheme to be adopted. For example, if a 128b/130b or 128b/132b coding scheme is adopted, one ALE block includes 8 PDUs (128 bits). In another example of using a 256b/258b or 256b/260b coding scheme, one ALE block includes 16 PDUs (256 bits). In a further example of using a 512b/514b or 512b/516b coding scheme, one ALE block includes 32 PDUs (512 bits).

Figure 6A:
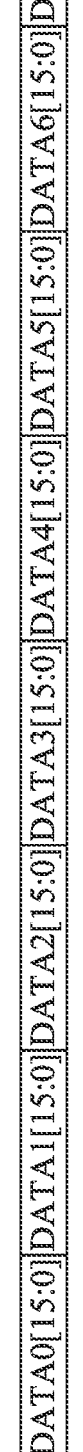
FIG. 6A is a schematic diagram illustrating an example of ALE data block generation.

In an embodiment, PHY_ALE_SAP can be implemented to perform ALE data block generation. An ALE data block includes synchronization header (denoted by SyncHdr) bits (or called preamble bits) and a specific number of the data PDUs (e.g., 8 PDUs). The format of an ALE data block can be represented by {SyncHdr bits, PDUx8}. FIG. 6A illustrates an example of ALE data block generation in a schematic diagram. The PHY_ALE_SAP can be implemented to receive a plurality of data PDUs, for example, denoted by DATA0[15:0], DATA1[15:0], DATA7[15:0] as shown on the middle portion of FIG. 6A, from the PA_ALE_SAP. For example, the PA_ALE_SAP directly maps a number of DL data PDUs, for example, denoted by PDU0[15:0], PDU1[15:0], . . . , PDU7[15:0] as shown on the upper portion of FIG. 6A into the data PDUs (e.g., DATA0[15:0] to DATA7[15:0]). The PHY_ALE_SAP can be implemented to generate an ALE data block by adding a synchronization header (e.g., denoted by P[x:0]) and assembling a specific number of the received data PDUs (e.g., 8 PDUs), as shown on the lower portion of FIG. 6A.

In the above or other examples, P[x:0] represents the SyncHdr bits, wherein x indicates an integer greater than zero. In the case of 128b/130b or 256b/258b coding scheme or similar coding scheme, the size of SyncHdr bits is 2 (i.e., x=1). In the case of 128b/132b or 256b/260b coding scheme or similar coding scheme, the size of SyncHdr bits is 4 (i.e., x=3).

Figure 6B:
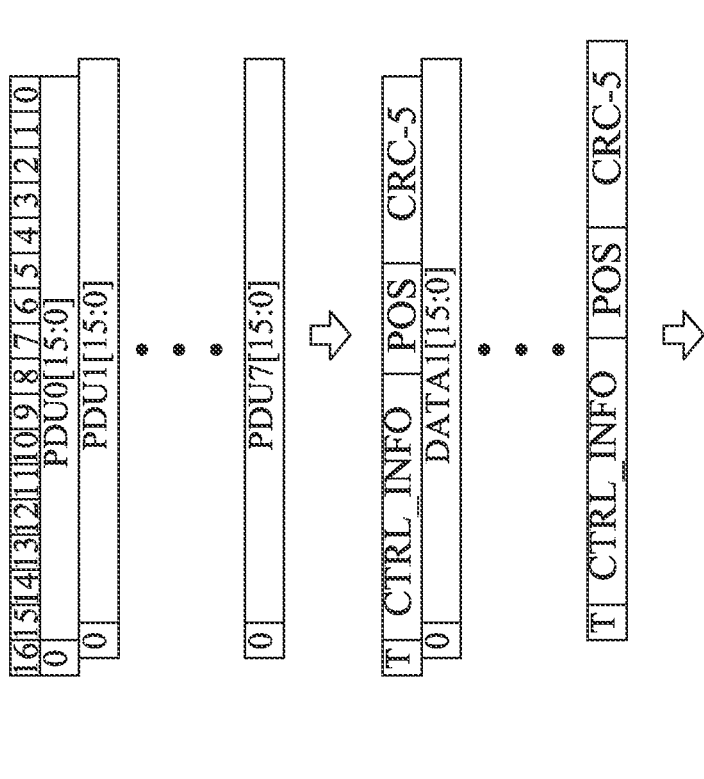
FIG. 6B is a schematic diagram illustrating an example of ALE control block generation.
Figure 6B:
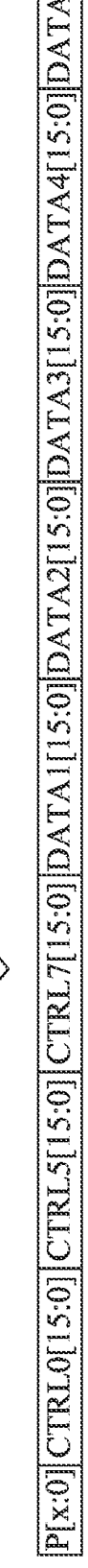

In another embodiment, the PHY_ALE_SAP can be implemented to perform ALE control block generation. An ALE control block includes synchronization header (denoted by SyncHdr) bits (or called preamble bits), at least one control information PDU (or simply referred to as control PDU), such as DL_CTRL_INFO or PA_CTRL_INFO PDU, and may include one or more data information PDU (or simply referred to as data PDU), up to a specific number of PDUs (e.g., 8 PDUs). The format of an ALE control block can be represented by {SyncHdr bit, CTRL_INFO PDUs, Data PDUs}. FIG. 6B illustrates an example of ALE control block generation in a schematic diagram. The PHY_ALE_SAP can be implemented to receive a plurality of PDUs, which may include one or more CTRL_INFO PDUs and data PDUs as shown on the middle portion of FIG. 6B, from the PA_ALE_SAP. For example, the PA_ALE_SAP maps a number of PDUs from the DL layer or the PA layer into a number of PDUs for ALE. For example, the PDUs, denoted by PDU0[15:0], PDU1[15:0], . . . , PDU7[15:0], as shown on the upper portion of FIG. 6B, may include at least one ESC_DL related PDUs or ESC_PA related PDUs from the DL layer or the PA layer. The PDUs for ALE, as shown on the middle portion of FIG. 6B, may include CTRL_INFO PDUs and data PDUs. The PHY_ALE_SAP can be implemented to generate an ALE control block according to the PDUs for ALE by adding a synchronization header (e.g., denoted by P[x:0]) and assembling a specific number of the PDUs (e.g., 8 PDUs) including at least one control PDU, as shown on the lower portion of FIG. 6B. In the ALE control block, all of the CTRL_INFO PDUs are arranged in series after the synchronization header, as illustrated in FIG. 6B. In other words, the PHY_ALE_SAP can be implemented to be capable of reordering the PDUs for ALE to generate the ALE control block.

Figure 6C:
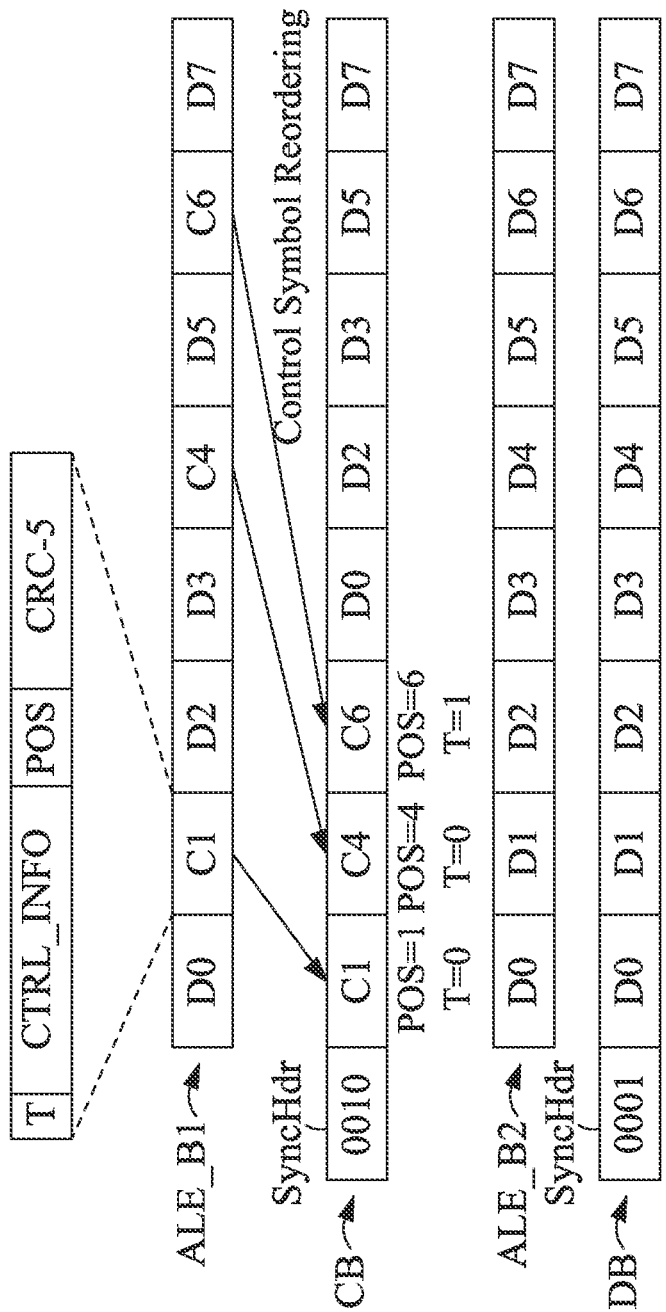
FIG. 6C is a schematic diagram illustrating examples of ALE control block reordering.

Referring to FIG. 6C, an example of ALE control block reordering (or referred to as control symbol reordering) is illustrated in a schematic diagram. In this example, the PHY_ALE_SAP receives a specific number (e.g., 8) of PDUs, denoted by D0, C1, D2, D3, C4, D5, C6, and D7, as an ALE block (denoted by ALE_B1) from the PA_ALE_SAP, wherein D0, D2, D3, D5, and D7 represent respective data PDUs; and C1, C4, and C6 represent respective control PDUs. In the ALE block ALE_B1, for example, there are 3 control symbols (or control PDUs), namely C1, C4, and C6, locating at positions 1, 4, and 6, respectively, in relation to D0 locating at position 0. The PHY_ALE_SAP generates an ALE control block (denoted by CB) according to the ALE block ALE_B1 by reordering the 8 PDUs of the ALE block ALE_B1. After reordering, the control symbols C1, C4, and C6 are arranged or placed in series after the synchronization header in the ALE control block CB, as illustrated in FIG. 6C. Specifically, the control symbol C1 is arranged on the first PDU location of the ALE control block CB and has its POS field with a value of '001' in binary. The control symbol C4 is arranged on the second PDU location of the ALE control block CB and has its POS field with a value of '100' in binary (or 4 in decimal). In addition, the control symbol C6 is arranged on the third PDU location of the ALE control block CB and has its POS field with a value of '110' in binary (or 6 in decimal). Meanwhile, after the reordering, the T tags of the control symbols C1, C4, and C6 are set to 0, 0, and 1, respectively, to indicate whether there is another control symbol (or control PDU) in the ALE block ALE_B1 which is placed after the control symbol in the ALE control block CB (or the ALE block ALE_B1). In this ALE control block CB, a control symbol with a T tag of value 0, such as C1 and C4, indicates that there is another control symbol follows or is placed after the current control symbol while a control symbol with a T tag of value 1, such as C6, indicates that there is no control symbol follows C6 and, in other words, it is the last control symbol in this ALE control block CB and that one or more data symbols, if any, follow the last control symbol C6 in the ALE control block CB.

As illustrated above, the DL frames or PACP frames on the sending side, such as a host (or a device), are translated into ALE control blocks or data blocks. The modified M-PHY for the ALE can be implemented to transmit the ALE control blocks or data blocks to a receiving side (or called receiver side), such as a device (or a host).

On the receiver side, a modified version of UniPro can be implemented to restore the PDUs of an ALE control block to its former ordering by checking the POS fields of the control symbols of the ALE control block. An embodiment of a process for restoring operations is as follows. First, finding a synchronization header of a control block is performed, wherein the control block has at least one PA_CTRL_INFO or DL_CTRL_INFO. Secondly, a control symbol, e.g., PA_CTRL_INFO or DL_CTRL_INFO, from the first PDU after the synchronization header is extracted. The T tag of the control symbol is then examined. If T=0, extraction of the followed PA_CTRL_INFO or DL_CTRL_INFO on the next PDU is performed. If T=1, extraction of the followed data PDU on the next PDU is performed. Restoring PA_CTRL_INFO or DL_CTRL_INFO PDUs is performed after the examination of the last PDU.

As above mentioned, in the advanced line encoding scheme, there is no K-Code (control symbols) of 8b/10b coding scheme for the receiver to do symbol alignment and symbol lock operation. In order to resolve symbol alignment and symbol lock issue in the ALE coding scheme, an ALE control block is generated on the transmitter side as illustrated above by reordering control symbols to be transmitted for symbol alignment and symbol lock and the ALE control block can then be restored on the receiver side accordingly.

TABLE 1 illustrates an example of control symbols mapping for the ALE.

TABLE 1

| ALE_EscType | T bit 15 | ALE_EscParam bit 14 | bit 13 | bit 12 | bit 11 | bit 10 | bit 9 | bit 8 | POS bit 7:5 | CRC-5 Bit 4:0 |
|---|---|---|---|---|---|---|---|---|---|---|
| SOF | | 2'b00 | | 0 | Rsvd | Rsvd | TC | | | |
| AFC | | 2'b00 | | 1 | Rsvd | CReq | TC | | | |
| COF | | 2'b01 | | 2'b00 | | Rsvd | TC | | | |
| NAC | | 2'b01 | | 2'b01 | | RReq | Rsvd | Rsvd | | |
| <FLR, FLR> | | 2'b01 | | 4'b1000 | | | | Rsvd | | |
| <MK4, MK4> | | 2'b01 | | 4'b1001 | | | | Rsvd | | |
| <MK2, FLR> | | 2'b01 | | 4'b1010 | | | | Rsvd | | |
| <MK2, MK2> | | 2'b01 | | 4'b1011 | | | | Rsvd | | |
| Reserved | | 2'b01 | | 4'b1100 | | | | Rsvd | | |
| Reserved | | 2'b01 | | 4'b1101 | | | | Rsvd | | |
| Reserved | | 2'b01 | | 4'b1110 | | | | Rsvd | | |
| PACP | | 2'b01 | | 4'b1111 | | | | Rsvd | | |
| EOF_EVEN | | 2'b10 | | Frame Sequence Number | | | | | | |
| EOF_ODD | | 2'b11 | | Frame Sequence Number | | | | | | |

As illustrated in TABLE 1, the control symbol types (denoted by ALE_EscType), such as SOF, AFC, COF, NAC, <FLR, FLR>, <MK4, MK4>, <MK2, FLR>, <MK2, MK2>, PACP, EOF_EVEN, EOF_ODD, of the new frame structure for the ALE (e.g., some of them appear on the new frame structure on the right side of FIG. 5A to 5D) may have specific values corresponding to escaped parameters (denoted by ALE_EscParam) of the control symbol (or control PDU) for the ALE. In TABLE 1, as can be defined in the conventional UniPro specification or further defined, TC stands for traffic class; CReq stands for credit transmit request; RReq stands for reset link request; frame sequence number is used with each data frame. Some fields are reserved (denoted by Rsvd or RSV).

In addition, as compared to the 8b/10b coding scheme used in the conventional UniPro and M-PHY specifications, it is not necessary for an implementation of the advanced line encoding with data scrambling to use the conventional UniPro IDLE symbol encoding. M-PHY symbol pairs <MK3, FLR>, <MK3, DAT>, <DAT, FLR> are also not used in the implementation of the advanced line encoding.

The following provides various embodiments for implementation of the interconnection protocol with the ALE according to FIG. 1.

Figure 7A:
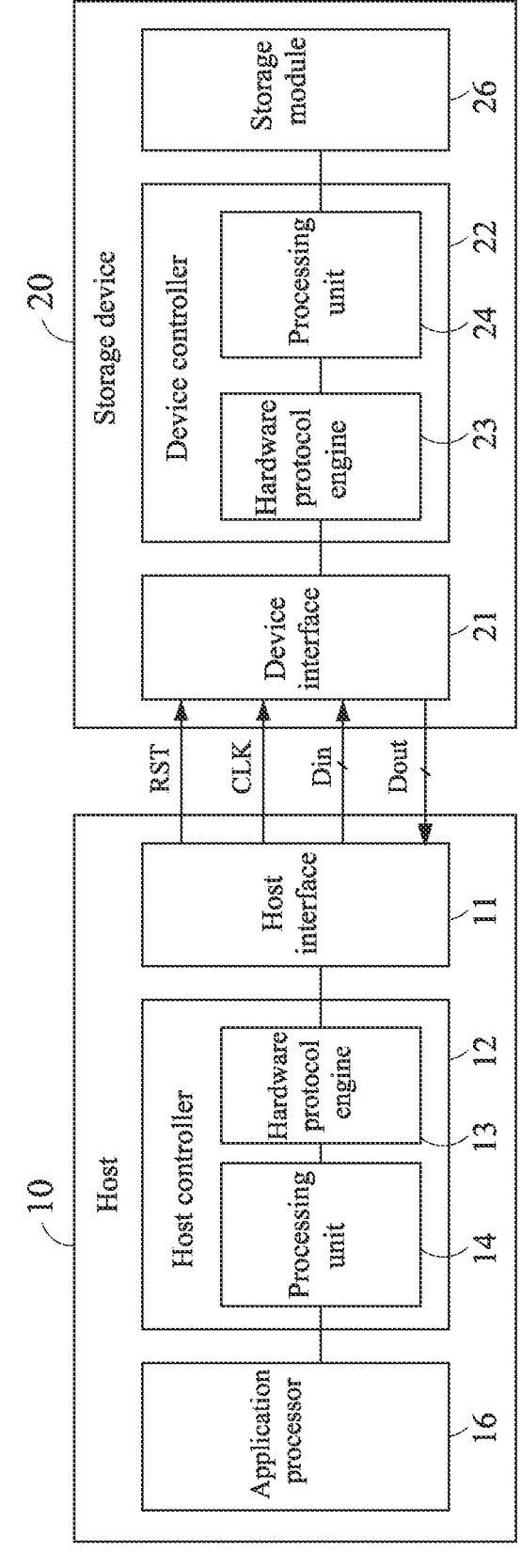
FIG. 7A is a diagram illustrating circuit architecture of a storage system for an interconnection protocol capable of performing ALE according to an embodiment of the present invention.

Referring to FIG. 7A, a diagram of circuit architecture is shown according to an embodiment of the present invention. As shown in FIG. 7A, a storage system 1 includes a host 10 and a storage device 20. The host 10 and the storage device 20 communicate through an interconnection protocol in between, thereby allowing the host 10 to perform data access of the storage device 20. The interconnection protocol is the interconnection protocol with the ALE as mentioned above

Figures 7B, 7C:
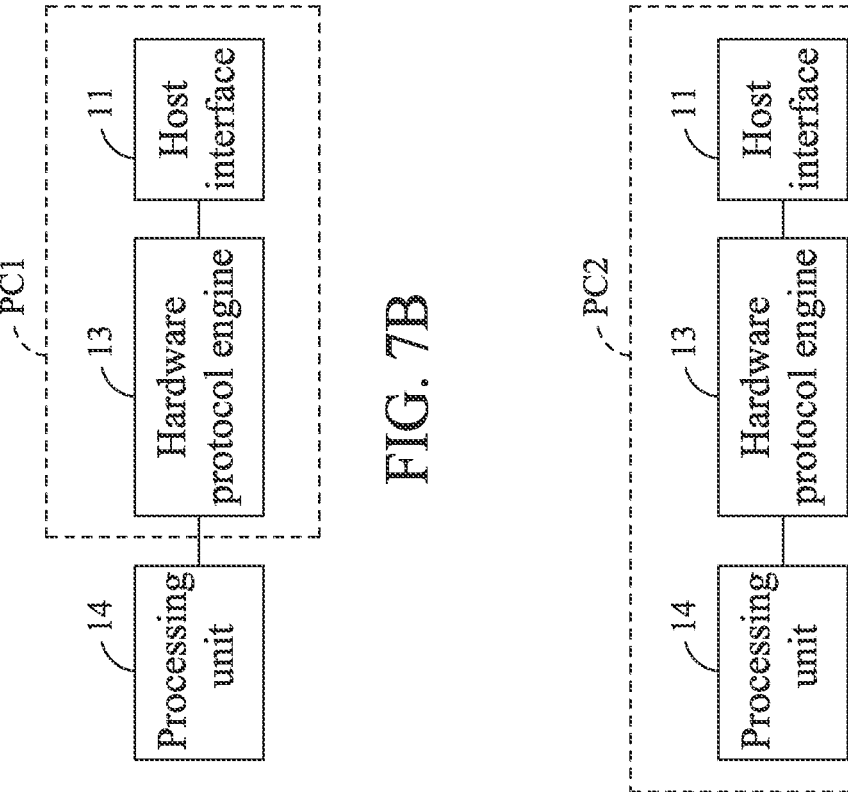
FIG. 7B is a block diagram illustrating circuit architecture applicable to the controller in FIG. 7A for the interconnection protocol according to an embodiment of the present invention.
FIG. 7C is a block diagram illustrating circuit architecture applicable to the controller in FIG. 7A for the interconnection protocol according to an embodiment of the present invention.

12 based on FIG. 1. According to the circuit architecture in FIG. 7A, the foregoing technique is applicable to a first device (for example, the storage device 20 in FIG. 7A) capable of linking to a second device (for example, the host 10 in FIG. 7A) according to the interconnection protocol, and is also suitable in an application scenario where the first device is the host 10 and the second device is the storage device 20. In the circuit architecture of FIG. 7A, a controller in the host 10 or the storage device 20 used to implement the interconnection protocol may be implemented by various configurations. As shown in FIG. 7A, the controller (for example, a host controller 12) in the host 10 used to implement the interconnection protocol or the controller (for example, a device controller 22) in the storage device 20 used to implement the interconnection protocol can be implemented as circuit architecture including a hardware protocol engine and a processing unit, wherein the processing unit of the controller is optional. In another example, as shown in FIG. 7B, the controller in the host 10 used to implement the interconnection protocol is referred to as, for example, a protocol controller PC1, which can be configured to include a host interface 11 and a hardware protocol engine 13 and be implemented as a single chip, wherein a processing unit 14 may be regarded as an external circuit of the protocol controller PC1. Moreover, similarly, the controller (or referred to as a protocol controller of the storage device 20) in the storage device 20 used to implement the interconnection protocol can be configured to include a device interface 21 and a hardware protocol engine 23 and be implemented as a single chip, wherein a processing unit 24 may be regarded as an external circuit of the protocol controller. For another example, as shown in FIG. 7C, the controller in the host 10 used to implement the interconnection protocol, for example, a protocol controller PC2, can be configured to include the host interface 11, the hardware protocol engine 13 and the processing unit 14, and be implemented as a single chip. Moreover, similarly, the controller (or referred to as a protocol controller of the storage device 20) in the storage device 20 used to implement the interconnection protocol can be configured to include the device interface 21, the hardware protocol engine 23, and the processing unit 24, and be implemented as a single chip. Thus, according to the circuit architecture in FIG. 7A, the controller used to implement the interconnection protocol in the host 10 or the storage device 20 can be regarded to cover or represent the embodiment based on FIG. 7A, FIG. 7B, or FIG. 7C. The description of other examples related to FIG. 7A is also suitable for the embodiments based on FIG. 7A, FIG. 7B, or FIG. 7C.

The circuit architecture shown in FIG. 7A has sufficient flexibilities and can be efficiently configured to meet requirements of different products, so as to adapt to diversified designs of manufacturers for better product development. The host 10 is, for example, a computing device such as a smartphone, a tablet computer, or a multimedia device. The storage device 20 is, for example, a storage device inside or outside the computing device, and is such as a storage device based on a non-volatile memory. The storage device 20 can be written with data under control of the host 10 or provide written data to the host 10. The storage device 20 can be implemented as an internal memory device, memory card, solid state drive (SSD), or so on; however, the implementation of the present disclosure is not limited to the examples above.

The host 10 includes the host interface 11, the host controller 12, and an application processor 16.

The host interface 11 implements a physical layer of the interconnection protocol so as to link to the storage device 20. For example, the host interface 11 implements a modified version of physical (M-PHY) layer as exemplified above.

The host controller 12 is coupled between the host interface 11 and the application processor 16. When the application processor 16 needs to perform data access of the storage device 20, it sends a corresponding access operation command or write data to the host controller 12 and communicates with the storage device 20 through the interconnection protocol, thereby completing data access of the storage device 20.

The host controller 12 includes, for example, the hardware protocol engine 13 and the processing unit 14, wherein the processing unit 14 is optional.

The hardware protocol engine 13 implements a link layer of the interconnection protocol. The link layer can be implemented according to a modified version of UniPro as exemplified above. The hardware protocol engine 13 communicates with the host interface 11 and the processing unit 14 and performs data conversion according to the specification of the link layer.

The processing unit 14 is coupled to the hardware protocol engine 13, and communicates with the application processor 16. The processing unit 14 can execute one or more pieces of firmware. For example, an access operation command or write data sent by an operating system, a driver, or an application executed by the application processor 16 is converted into a command or data in a format compliant with the link layer of the interconnection protocol by the firmware executed by the processing unit 14, and is then sent to the hardware protocol engine 13 for processing according to specification of the link layer. Alternatively, read data returned by the storage device 20 in response to a read command of the host 10 is returned to the hardware protocol engine 13 according to the specification of the link layer of the interconnection protocol, and is converted by the corresponding firmware executed by the processing unit 14 into data in a format that is compliant with and readable by the operating system, driver, or application executed by the application processor 16. The firmware can be stored, for example, in an internal memory of the processing unit 14, or be stored in an internal memory of the host controller 12, wherein the internal memory can include a volatile memory and a non-volatile memory. The processing unit 14 is optional, that is, the task of the firmware above may be implemented at the hardware protocol engine 13 by hardware.

The storage device 20 includes the device interface 21, the device controller 22, and a storage module 26.

The device interface 21 implements a physical layer of the interconnection protocol to link to the host 10. For example, the device interface 21 is for implementing a modified version of physical (M-PHY) layer as exemplified above.

The device controller 22 is coupled between the device interface 21 and the storage module 26. The device controller 22 fundamentally has functions corresponding to those of the host controller 12 described above. When the host 10 issues and sends an access operation command or write data to the storage device 10 through the interconnection protocol, the device controller 22 converts the received data into a corresponding access operation command or write data through the interconnection protocol so as to facilitate data access to be performed by the storage module 26. Alternatively, the device controller 22 returns, according to the link layer of the interconnection protocol, read data returned by the storage device 20 in response to the read command of the host 10 to the host 10. The storage module 26 includes, for example, a memory chip of one or more non-volatile memories, and is, for example, a flash memory chip. Herein, in one example, the storage device 20 may further be provided with a flash memory controller. The flash memory controller is coupled between the device controller 22 and the storage module 26, and can be configured to control write, read, or erase operations of the storage module 26, and is capable of data exchange with the storage module 26 through an address bus or a data bus. In another example, the flash memory controller may be further provided in the device controller 22.

The device controller 22 includes, for example, the hardware protocol engine 23 and the processing unit 24, wherein the processing unit 24 is optional.

The hardware protocol engine 23 implements a link layer of the interconnection protocol. The link layer can be implemented according to a modified version of UniPro as exemplified above. The hardware protocol engine 23 communicates with the device interface 21 and the processing unit 24 and performs data conversion according to the specification of the link layer.

The processing unit 24 is coupled to the hardware protocol engine 23, and communicates with the host 10 through the device interface 21. The processing unit 24 can execute one or more pieces of firmware. For example, the processing unit 24 executes one or more pieces of firmware to communicate with the above flash memory controller, so as to exchange data such as an access operation command, write data or read data between the interconnection protocol and the flash memory controller. The firmware can be stored, for example, in an internal memory of the processing unit 24, an internal memory of the device controller 22, or a predetermined storage region of the storage module 26, wherein the internal memory can include a volatile memory and a non-volatile memory.

As shown in FIG. 7A, the host interface 11 can be coupled to the device interface 21 through data lines Din and Dout for transmitting/receiving data, a reset line RST for transmitting a hardware reset signal, and a clock line CLK for transmitting data. The data lines Din and Dout can be implemented in multiple pairs, wherein one pair of data lines Din or one pair of data lines Dout can be referred to as a lane. The host interface 11 can communicate with the device interface 21 by using at least one interface protocol based on an advanced line encoding scheme, such as 128b/130b or 128b/132b coding scheme or so on; however, the implementation of the disclosure is not limited to the examples above. Under a modified version of the UFS standard, the host 10 and the storage device 20 may also be configured with multiple lanes in between to improve transmission efficiency, wherein either of the directions from the host 10 to the storage device 20 or from the storage device 20 to the host 10 can support one or more lanes, and the multiple lanes can be selectively set to be active or inactive.

A modified version of the UFS standard is taken as an example of the interconnection protocol with the ALE for illustration. The UFS standard includes a UFS command set (UCS) layer, a UFS transport (UTP) layer, and a UFS interconnect (UIC) layer. The UIC layer includes a link layer and a physical layer. In the interconnection protocol with the ALE, the link layer of the UIC layer can be defined according to a modified version of the UniPro specification, and the physical layer of the UIC layer can be defined according to a modified version of the M-PHY specification. Under the interconnection protocol, since the implementations of the modified UniPro and modified M-PHY with respect to the ALE are hidden from the other layers (such as UCS, UTP layers) of the UFS standard, the PHY adapter layer SAP model for ALE as illustrated in FIG. 3 facilitates the implementation of the interconnection protocol with the ALE and reduces its implementation complexity.

Figure 8:
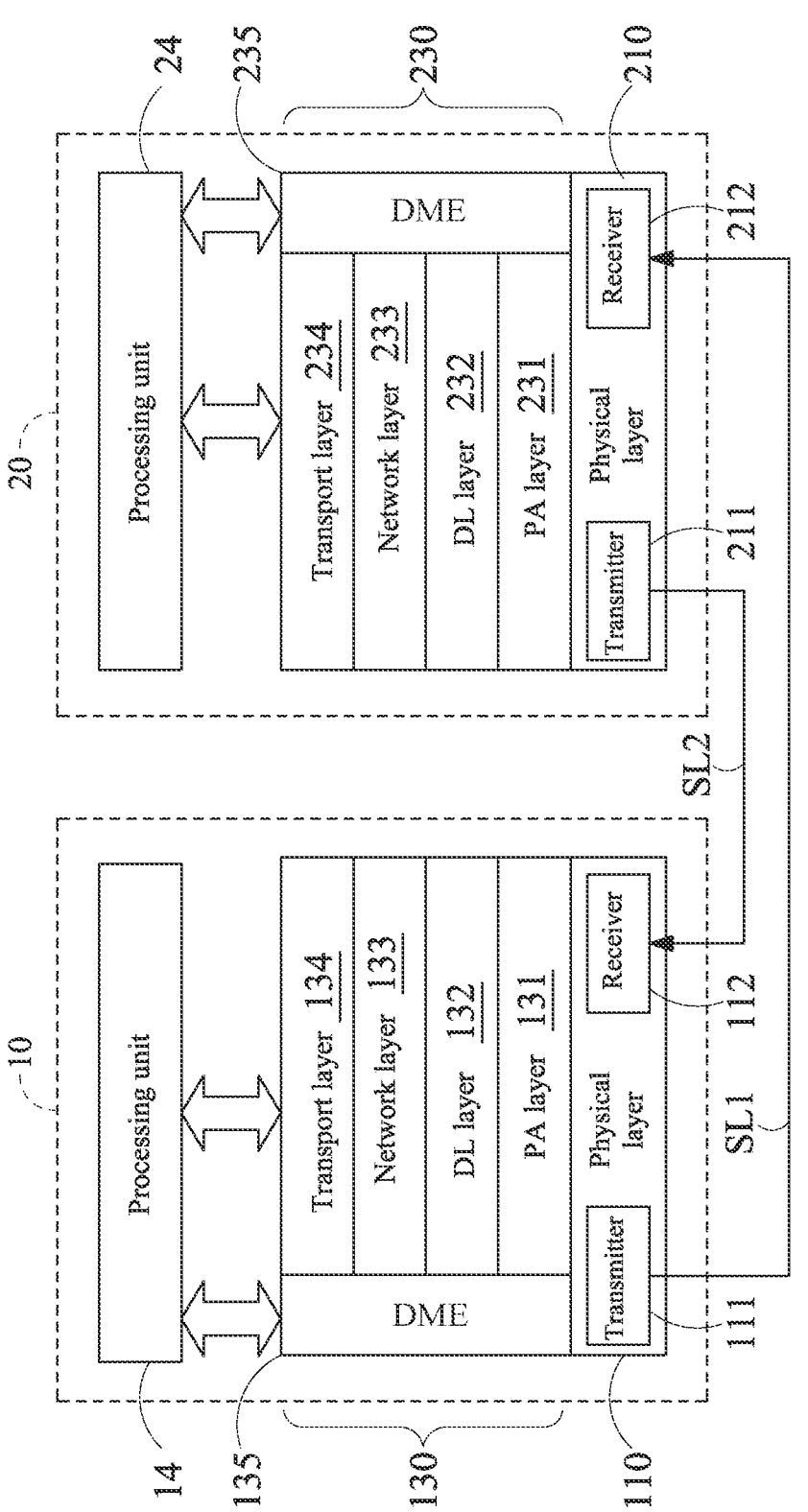
FIG. 8 is a schematic diagram of a layered structure of the storage system in FIG. 7A according to the interconnection protocol capable of performing ALE.

Referring to FIG. 8, a schematic diagram of layered architecture of the storage system in FIG. 7A is shown according to the UFS standard and FIG. 1. Because the UFS standard is based on the MIPI UniPro layer and the MIPI M-PHY layer, the host interface 11 and the hardware protocol engine 13 of the host 10 shown in FIG. 7A are respectively used to implement a modified physical layer 110 and a modified UniPro layer 130 in FIG. 8. The modified physical layer 110 and modified UniPro layer 130 are the corresponding layers in the host as shown in FIG. 1. Also, the device interface 21 and the hardware protocol engine 23 of the storage device 20 in FIG. 7A are respectively used to implement a modified physical layer 210 and a modified UniPro layer 230 in FIG. 8. Likewise, the modified physical layer 210 and modified UniPro layer 230 are the corresponding layers in the device as shown in FIG. 1.

As shown in FIG. 8, the modified UniPro layer 130 (or 230) can include a modified PHY adapter (PA) layer 131 (or 231), a data link (DL) layer 132 (or 232), a network layer 133 (or 233), and a transport layer 134 (or 234). The layers in the modified UniPro layer 230 of the storage device 20 can also similarly operate and be implemented.

The modified PHY adapter layer (131 or 231) couples the modified physical layer (110 or 210) to the data link layer (132 or 232). The modified PHY adapter layer (131 or 231) is capable of performing bandwidth control and power management between the modified physical layer (110 or 210) and the data link layer (132 or 232). In practice, the modified physical layer 110 of the host 10 includes a transmitter (TX) 111 and a receiver (RX) 112, and the modified physical layer 210 of the storage device 20 includes a transmitter (TX) 211 and a receiver (RX) 212, thereby establishing data lanes SL1 and SL2 to perform full duplex communication. The modified UniPro specification may support multiple data lanes for a link in each transmission direction (for example, forward or backward).

The data link layer (132 or 232) is capable of performing flow control of data transmission between the host 10 and the storage device 20. In addition, as exemplified above, CRC-64 can be used and determined during data link (DL)

framing in an implementation of the interconnection protocol capable of performing the ALE, instead of CCITT CRC-16 adopted in the conventional version of UniPro for DL framing.

The network layer (133 or 233) is used to select a routing function for a transmission path for the packets received from the transport layer (134 or 234).

The transport layer (134 or 234) can use a command received from the UFS application layer to configure a data segment suitable for the protocol and transmit the data segment to the network layer (133 or 233), or can extract a command from packets received from the network layer (133 or 233) and transmit the command to the UFS application layer.

Moreover, the modified UniPro layer (130 or 230) can be further defined with a device management entity (DME) (135 or 235), which can communicate with the layers in the modified physical layer (110 or 210) and the modified UniPro layer (130 or 230), for example, the modified PHY adapter layer (131 or 231), the data link layer (132 or 232), the network layer (133 or 233), and the transport layer (134 or 234), so as to communicate with the UFS application layer, thereby implementing the modified unified protocol (UniPro) overall functions such as control or configuration functions including power-on, power-off, reset, and power consumption mode change.

Figure 9:
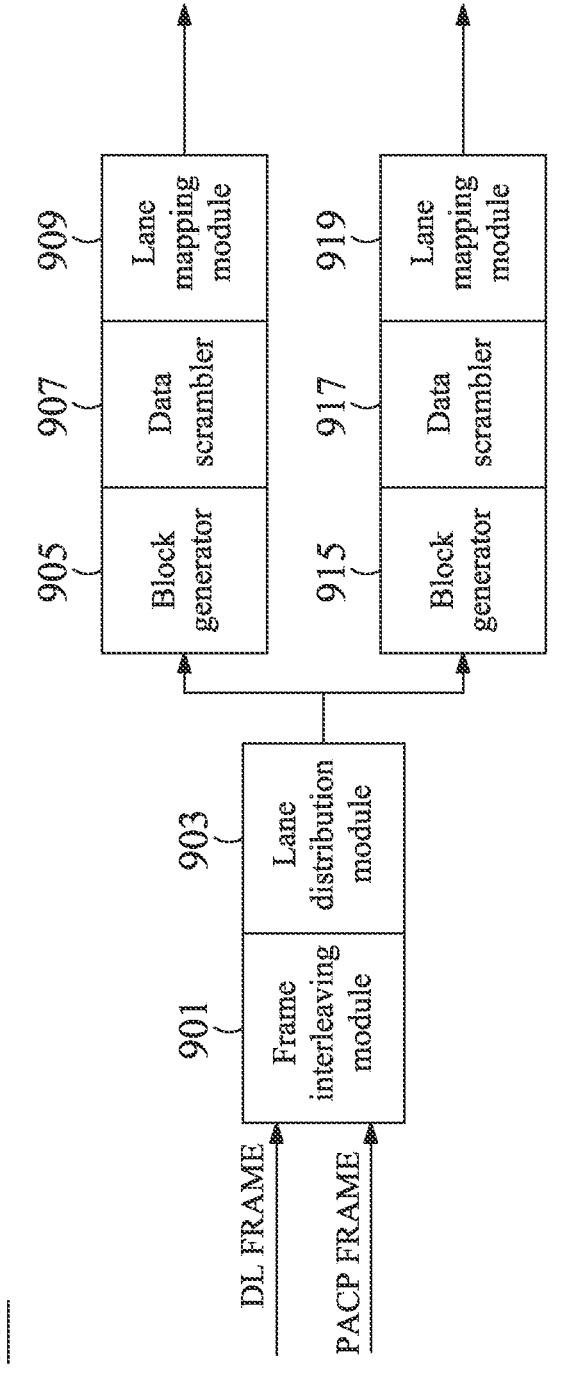
FIG. 9 is a block diagram illustrating circuit architecture applicable to the controller in FIG. 7A for a PA layer transmitter for the interconnection protocol according to an embodiment of the present invention.

FIG. 9 illustrates circuit architecture applicable to the controller in FIG. 7A for a PA layer transmitter for the interconnection protocol with the ALE according to an embodiment of the present invention. A PA layer transmitter 900 can be implemented according to the circuit architecture illustrated in FIG. 9 to process DL frames or PACP frames in order to transmit corresponding ALE control or data blocks through the physical layer, e.g., a modified M-PHY, of the sending side. In an embodiment, the PA layer transmitter 900 includes a frame interleaving module 901, a lane distribution module 903, block generators 905, 915, data scramblers 907, 917, and lane mapping modules 909, 919. In FIG. 9, As compared to an implementation of the conventional UniPro (e.g., version 2.0), the lane distribution module 903 is capable of performing burst starting (opening) or ending (closing) in addition to performing PDU distribution. The lane distribution module 903 is configured to perform ordered set insertion, for example, to start a burst transmission. In starting a new burst transmission for the interconnection protocol capable of performing the ALE, at least one ordered set (e.g., {SKP OS+SDS OS}, which will be illustrated later) is inserted (e.g., transmitted through all lanes) instead of a <MK0, MK1> pattern which is used for the conventional UniPro (e.g., version 2.0). When the burst transmission is to be ended or closed for the interconnection protocol, symbol pairs <MK2, FLR> or <MK2, MK2> PDU, which are used for the conventional UniPro (e.g., version 2.0), can be adopted as an end of burst sequence for in an implementation of the interconnection protocol. Whenever there is no data transfer from both DL/PACP framing for the interconnection protocol, symbol pairs <FLR, FLR> are inserted, as similar as those used for the conventional UniPro (e.g., version 2.0). In addition, skip symbol insertion of skip symbol pairs <MK4, MK4> in intervals not exceeding PA_TxSkipPeriod, as similar as that for the conventional UniPro (e.g., version 2.0), can be adopted in an implementation of the interconnection protocol. Moreover, in an implementation of the interconnection protocol, skip symbol pairs <MK4, MK4> will be mapped to control PDUs which are input to the block generators 905 and 915 to generate ALE control blocks and the ALE control blocks are to be scrambled, in contrast to the skip symbol pairs <MK4, MK4> in the conventional UniPro not to be scrambled. The mapping of the symbol pairs such as <FLR, FLR>, <MK4, MK4>, <MK2, FLR>, and <MK2, MK2> for control symbols (or control PDUs) for the interconnection protocol is illustrated in TABLE 1.

In addition, IDLE sequence encoding is skipped in an implementation of the interconnection protocol with the ALE according to FIG. 9. In addition, in the PA layer transmitter 900, an ordered set insertion for symbol alignment (or block alignment) is performed, for example, when lane distribution is performed by using the lane distribution module 903. Afterward, lane-based block generation is being executed to generate ALE control or data blocks, for example, by using the block generators 905 and 915. During the block generation, control PDUs are reordered. Further, these ALE control or data blocks are scrambled, for example, by using the data scramblers 907 and 917. The synchronization headers of the ALE control or data blocks are not involved in scrambling by the data scramblers 907 and 917. The synchronization headers and scrambled data are sent to the physical layer (i.e. a modified version of M-PHY) via a reference M-PHY module interface (RMMI) for ALE by using the lane mapping modules 909, 919.

For example, the frame interleaving module 901 receives one or more DL frames or PACP frames and interleaves the DL or PACA frames or both of them. The lane distribution module 903 receives the interleaved frames from the frame interleaving module 901 and distributes the interleaved frames over subsequent modules dedicated to one or more lanes. For example, the block generator 905, data scrambler 907, and lane mapping module 909 of the PA layer transmitter 900 are used for a first lane (or referred to as lane 0). The block generator 915, data scrambler 917, and lane mapping module 919 of the PA layer transmitter 900 are used for a second lane (or referred to as lane 1). If the two lanes are set to be active, the lane distribution module 903 distributes the interleaved frames over the two lanes. The data scramblers 907, 917 perform data scrambling for the respective lanes, for example, derived from the UniPro specification (e.g., version 2.0). The lane mapping modules 909, 919 perform logical-to-physical lane mapping for the respective lanes.

In an embodiment according to the PA layer transmitter 900 in FIG. 9, one or more DL frames or PACP frames are in the form of the new frame structures as exemplified by the above embodiments shown in FIGS. 4A-4C and 5A-5D and received by the frame interleaving module 901. In another embodiment, the PA layer transmitter 900 can be implemented to perform mapping operations of the PA_ALE_SAP, for example, in the frame interleaving module 901 or by a frame mapper (not shown) coupled before the frame interleaving module 901.

Figure 10:
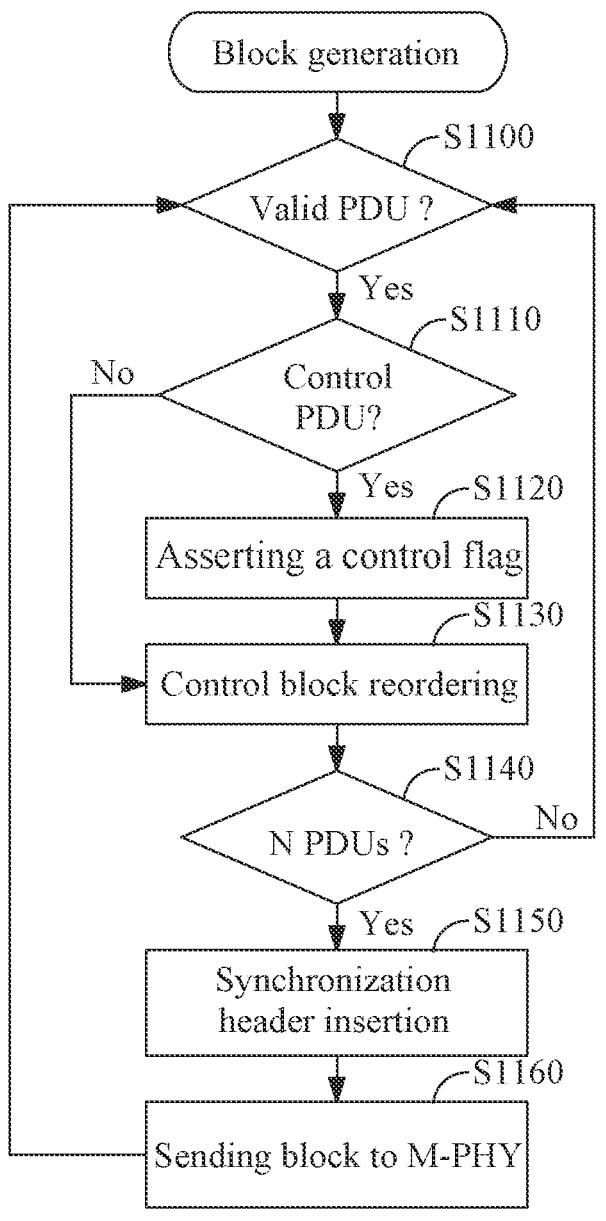
FIG. 10 is a flowchart illustrating a process for block generation according to an embodiment of the present disclosure.

FIG. 10 illustrates a flowchart of a process for block generation according to an embodiment of the present disclosure. The process for block generation can be implemented by a block generator for a lane, such as the block generator 905 or 915. The block generator (e.g., 905 or 915) can be realized to receive one or more control PDUs or data PDUs, as exemplified by the above embodiments shown in FIGS. 4A-4C and 5A-5D, from the lane distribution module 903 and generate one or more ALE control blocks or data blocks.

Referring to FIG. 10, in operation S1100, it is determined whether a valid PDU is found. If so, operation S1110 is executed; otherwise, the process may wait until a valid PDU is found. For example, a previous module of the block generator, such as the lane distribution module 903, may send a data signal indicating a PDU and a data valid signal indicating whether the PDU is valid. If the data valid signal is asserted, it indicates that the data signal indicates a valid PDU and can be received by the block generator. If the data valid signal is de-asserted, the data signal can be ignored.

In operation S1110, it is determined whether the valid PDU is a control (CTRL_INFO) PDU. If it is not a control PDU (i.e., the valid PDU is a data PDU), operation S1130 is executed. If it is a control PDU, a control flag (e.g., denoted by CTRL_Flag) is asserted in operation S1120 in order to indicate that the current ALE block requires synchronization header insertion for control block, wherein it is assumed that the control flag is initially de-asserted. In addition, the POS field of the control PDU may be set according to the sequence or position of the valid PDU in a round of processing a specific number (e.g., 8) of PDUs.

In operation S1130, control block reordering is performed for the valid PDU. For example, the valid PDU is inserted in a data buffer (e.g., a register set) in order to form an ALE block where the control PDU is arranged before the data PDU (if any).

In operation S1140, it is determined whether a specific number N (e.g., N=8) of PDUs have been examined. If 8 PDUs are examined, operation S1150 is executed to perform synchronization header insertion for an ALE control or data block having the 8 examined PDUs. Otherwise, the process is repeated from operation S1100 for next PDU examination. It is noted that in another implementation of the interconnection protocol, an ALE block may be configured to include N PDUs, rather than 8, such as 16, 32, as exemplified above, or other value whenever appropriate.

In operation S1150, the synchronization header insertion is performed to insert a synchronization header (e.g., 4b'0010) for an ALE control block when the control flag is asserted (e.g., CTRL_Flag==1) or insert a synchronization header (e.g., 4b'0001) for an ALE data block when the control flag is de-asserted (e.g., CTRL_Flag==0).

In operation S1160, the ALE control or data block completed by using operation S1150 is sent to the M-PHY (e.g., a modified version of M-PHY). The process can be repeated from operation S1100 again for a next round of processing of 8 valid PDUs.

In an example, the control block reordering in operation S1130 can be implemented according to a piece of pseudo code of hardware description language described in TABLE 2.

TABLE 2

| Pseudo code for control block reordering | comments |
| --- | --- |
| MODULE ctrl_block_reordering | If new PDU |
| INITIALIZE tx_space AS data array of 8 words | is CTRL |
| // 1 word = 16 bits; | PDU, then |
| // if CTRL PDU −> Reorder | perform |
| if ( new PDU is CTRL PDU) | reordering. |
| begin | |
|   if (tx_space[6] is occupied by a CTRL PDU) then | |
|     insert CTRL PDU in tx_space[7]; | |
|   else if (tx_space[5] is occupied by a CTRL PDU) then | |
|     insert CTRL PDU in tx_space[6] and shift | |
| DATA PDU; | |
|   else if (tx_space[4] is occupied by a CTRL PDU) then | |
|     insert CTRL PDU in tx_space[5] and shift | |

TABLE 2-continued

| Pseudo code for control block reordering | comments |
|---|---|
| DATA PDU; | |
|     else if (tx_space[3] is occupied by a CTRL PDU) then | |
|         insert CTRL PDU in tx_space[4] and shift | |
| DATA PDU; | |
|     else if (tx_space[2] is occupied by a CTRL PDU) then | |
|         insert CTRL PDU in tx_space[3] and shift | |
| DATA PDU; | |
|     else if (tx_space[1] is occupied by a CTRL PDU) then | |
|         insert CTRL PDU in tx_space[2] and shift | |
| DATA PDU; | |
|     else if (tx_space[0] is occupied by a CTRL PDU) then | |
|         insert CTRL PDU in tx_space[1] and shift | |
| DATA PDU; | |
|     else | If new PDU |
|   // New PDU is the first CTRL PDU | is DATA |
|     insert CTRL PDU in tx_space [0] and shift DATA | PDU, then |
| PDU; | storing it. |
|   end | |
|   else | |
|   // New PDU is DATA PDU; DATA PDU -> Store | |
|   begin | |
|     if (tx_space[0] is not occupied) then | |
|       put DATA PDU in tx_space[0]; | |
|     else if (tx_space[1] is not occupied) then | |
|       put DATA PDU in tx_space[1]; | |
|     else if (tx_space[2] is not occupied) then | |
|       put DATA PDU in tx_space[2]; | |
|     else if (tx_space[3] is not occupied) then | |
|       put DATA PDU in tx_space[3]; | |
|     else if (tx_space[4] is not occupied) then | |
|       put DATA PDU in tx_space[4]; | |
|     else if (tx_space[5] is not occupied) then | |
|       put DATA PDU in tx_space[5]; | |
|     else if (tx_space[6] is not occupied) then | |
|       put DATA PDU in tx_space[6]; | |
|     else   // because only tx_space[7] is available | |
|       put DATA PDU in tx_space[7]; | |
|   end | |
| end MODULE | |

The block generator (e.g., 905 or 915) can be implemented by circuitry according to the process of FIG. 10 and the pseudo code for control block reordering of TABLE 2. In an embodiment, the block generator includes a logic circuit for executing a process according to FIG. 10, a circuit module according to TABLE 2 (e.g., realizing MODULE ctrl_block_reordering), and a data buffer for providing a memory region for temporarily storing PDUs during a round of processing. For example, a data array (e.g., denoted by tx_space) of 8 words (each word of 16 bits) which can be referred to as tx_space[0] to tx_space[7] as described in TABLE 2, is used for storing 8 PDUs for an ALE block. In addition, flags or registers may also be used for indicating and checking whether an element of rx_space is valid or occupied in practice.

Taking FIG. 6C as an example, the following demonstrates how the block generator implements the control block reordering. Referring to FIG. 6C, in a round of block generation, there are 8 PDUs, for example, represented by D0, C1, D2, D3, C4, D5, C6, and D7, as an ALE block ALE_B1, sequentially input to the block generator. In the data buffer, tx_space[0] to tx_space[7] are initialized (e.g., each has the value of 0xFF) for each round of processing 8 PDUs. Firstly, the block generator receives a data PDU D0 and puts the data PDU Da in tx_space[0] by using the circuit module according to TABLE 2. Secondly, the block generator receives a control PDU C1. Since the control PDU C1 is the second PDU and the first control PDU in this round, the block generator sets the POS field of the control PDU C1 to 1 and asserts the control flag (e.g., CTRL_Flag==1) according to the process of FIG. 10, and puts the control PDU C1 in tx_space[0] and shifts the data PDU D0 to tx_space[1] by using the circuit module according to TABLE 2, wherein the corresponding T tag of the control PDU C1 is set to 1. After that, the block generator receives data PDU D2 and D3 and puts the data PDU D2 and D3 in tx_space[2] and tx_space[3] respectively by using the circuit module according to TABLE 2. The block generator then receives a control PDU C4, which is the second control PDU, and sets the POS field of the control PDU C4 to 4. According to TABLE 2, since tx_space[0] has been occupied by the control PDU C1, the block generator inserts the control PDU C4 in tx_space[1] and shifts the data PDU D0, D2, and D3 to tx_space[2], tx_space[3], and tx_space[4] respectively, wherein the corresponding T tags of the control PDU C1 and C4 are set to 0 and 1 respectively. The block generator then receives a data PDU D5 and puts the data PDU D5 in tx_space[5] according to TABLE 2. Afterwards, the block generator receives a control PDU C6, which is the third control PDU in this round and sets the POS field of the control PDU C6 to 6. According to TABLE 2, since tx_space[1] has been occupied by the control PDU C4, the block generator inserts the control PDU C6 in tx_space[2] and shifts the data PDU D0, D2, D3, and D5 to tx_space[3], tx_space[4], tx_space [5], and tx_space[6] respectively, wherein the corresponding T tags of the control PDU C4 and C6 are set to 0 and 1 respectively. The block generator then receives a data PDU D7 and puts the data PDU D7 in tx_space[7] by using the circuit module according to TABLE 2. After that, the block generator inserts a synchronization header for control block, as indicated by operation S1150, to the 8 PDUs processed by the circuit module so as to complete the ALE control block. In this manner, the ALE control block CB is generated as illustrated in FIG. 6C.

Referring again to FIG. 6C, in another round of block generation, there are 8 data PDUs, for example, represented by D0, D1, D2, D3, D4, D5, D6, and D7, as another ALE block (denoted by ALE_B2), sequentially input to the block generator. The data array is initialized when this round begins. According to TABLE 2, the data PDUs P0 to P7 will be put in tx_space[0] to tx_space[7] sequentially. After that, the block generator inserts a synchronization header for data block, as indicated by operation S1150, to the 8 PDUs processed by the circuit module so as to complete an ALE data block (denoted by DB). In this manner, the ALE data block DB is generated as illustrated in FIG. 6C.

On the sending side, the ALE control or data blocks are generated as exemplified in FIG. 6C and related embodiments. The ALE control or data blocks are then scrambled and transmitted to the physical layer through the data scrambler (e.g., 907 or 917) and lane mapping module (e.g., 909 or 919). In this manner, the ALE control or data blocks can then be transmitted by using the ALE over the link to the receiving side.

The following provides embodiments for PA layer with respect to the receiving side for the ALE. In some embodiments, the logical processing order of a PA layer receiver at the receiving side can be implemented according to an inverse of the logical processing order of the PA layer transmitter at the sending side.

Figure 11:
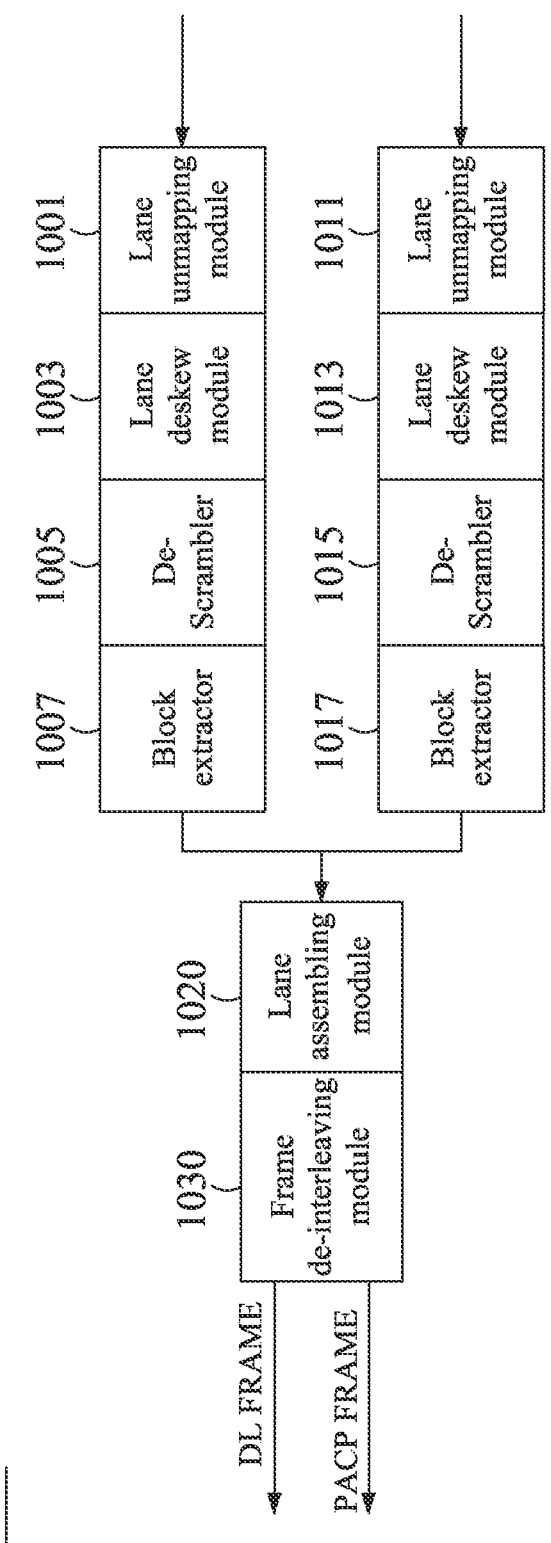
FIG. 11 is a block diagram illustrating circuit architecture applicable to the controller in FIG. 7A for a PA layer receiver for the interconnection protocol according to an embodiment of the present invention.

Referring to FIG. 11, circuit architecture applicable to the controller in FIG. 7A for a PA layer receiver for the interconnection protocol is illustrated according to an embodiment of the present invention. A PA layer receiver 1000 can be implemented according to the circuit architecture illustrated in FIG. 11 to process PHY symbols of respective lanes in order to receive corresponding ALE control or data blocks from the physical layer, e.g., a modified M-PHY, of the receiving side. In an embodiment, the PA layer receiver 1000 includes lane unmapping modules 1001, 1011, lane deskew modules 1003, 1013, descramblers 1005, 1015, block extractors 1007, 1017, a lane assembling module 1020, and a frame de-interleaving module 1030.

As compared to an implementation of the conventional UniPro (e.g., version 2.0), in an implementation of the interconnection protocol, as exemplified above for block generation, at least one ordered set (e.g., {SKP OS+SDS OS}, which will be illustrated later) is used to do alignment in between lanes. In addition, symbol pair <MK2, FLR> or <MK2, MK2> are used for end of burst detection for the interconnection protocol, which is used as similar as those used for the conventional UniPro (e.g., version 2.0). The skip symbol insertion is used in the implementation of the interconnection protocol, as similar as that for the conventional UniPro (e.g., version 2.0). Thus, on the receiving side, the PA layer receiver 1000 is configured to perform ordered set detection and skip symbol removal correspondingly.

In addition, IDLE sequence decoding is skipped in an implementation of the interconnection protocol with the ALE according to FIG. 11. In addition, in the PA layer receiver 1000, an ordered set detection is added for de-skew operation, for example, by using the lane deskew modules 1003 and 1013. Afterward, de-scrambling on data is performed to output ALE control or data blocks, for example, by using the de-scramblers 1005 and 1015, wherein an ordered set detection can also be performed. Lane-based block extraction is then performed on ALE control or data blocks to output control or data PDUs, for example, by using the block extractors 1007 and 1017. During the block extraction, the control PDU order is restored.

For example, the lane unmapping module 1001, lane deskew module 1003, de-scrambler 1005, block extractor 1007 of the PA layer receiver 1000 are used for the first lane (or referred to as lane 0). The lane unmapping modules 1011, lane deskew module 1013, de-scrambler 1015, block extractors 1007, 1017 the PA layer receiver 1000 are used for the second lane (or referred to as lane 1). The lane unmapping modules 1001, 1011 perform physical-to-logical lane mapping for the respective lanes, which is a reverse operation of what their counterparts (e.g., the lane mapping modules 909, 919) perform on the sending side. The de-scramblers 1005, 1015 perform data de-scrambling for the respective lanes, which is a reverse operation of what their counterparts (e.g., the data scramblers 907, 917) perform on the sending side. The block extractors 1007, 1017 perform block extraction on the de-scrambled symbols, which is a reverse operation of the block generation performed by their counterparts (e.g., the block generators 905, 915) on the sending side. If the two lanes are set to be active, the lane assembling module 1020 receives and assembles control or data symbols (i.e., control or data PDUs) from the two lanes. The lane assembling module 1020 performs a reverse operation of what its counterpart (e.g., the lane distribution module 903) performs on the sending side. The frame de-interleaving module 1030 receives the symbols output by the lane assembling module 1020 and de-interleaves the symbols into respective DL frames or PACP frames.

Figure 12:
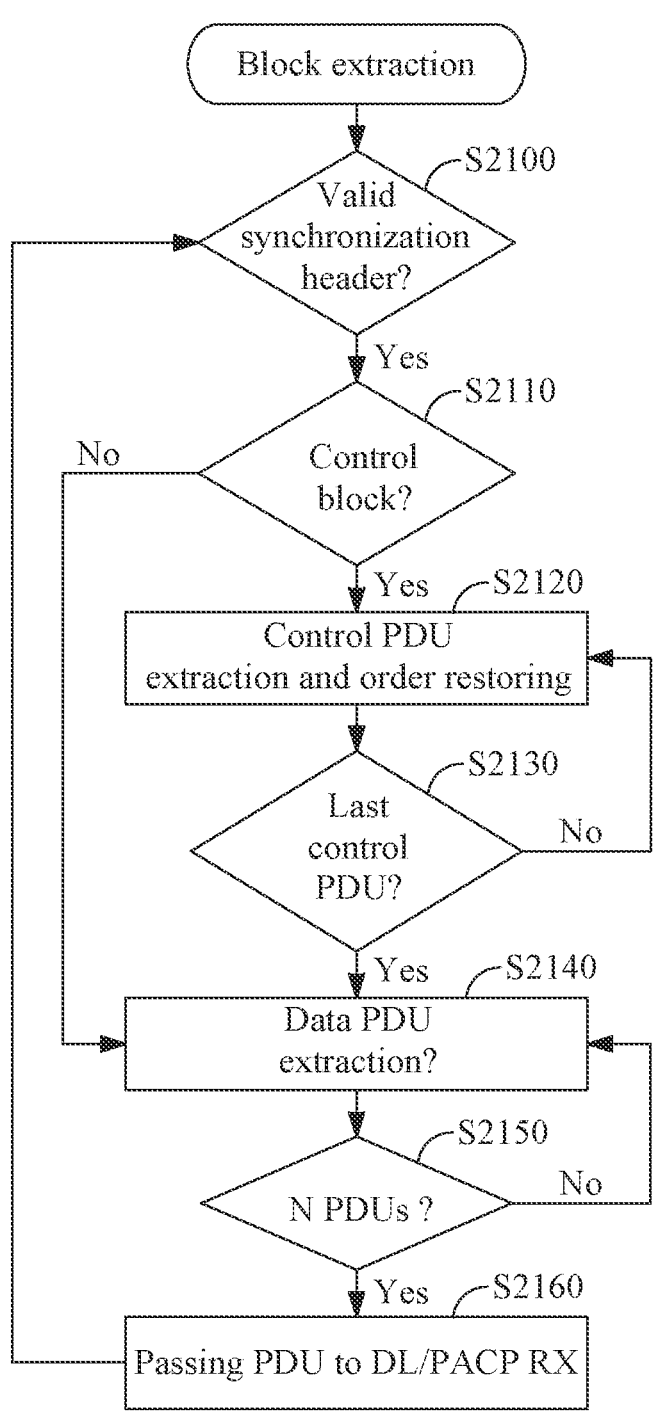
FIG. 12 is a flowchart illustrating block extraction according to an embodiment of the present disclosure.

FIG. 12 illustrates a flowchart of a process for block extraction according to an embodiment of the present disclosure. The process for block extraction can be implemented by a block extractor for a lane, such as the block extractor 1007 or 1017. The block extractor (e.g., 1007 or 1017) can be realized to receive one or more ALE control blocks or data blocks from the de-scrambler (e.g., 1005 or 1015) and generate one or more control PDUs or data PDUs, as exemplified by the above embodiments shown in FIGS. 4A-4C and 5A-5D.

Referring to FIG. 12, in operation S2100, it is determined whether a valid synchronization header is found. If so, the synchronization header is examined to determine block boundary, which is a location of the first symbol (or PDU) in an ALE control or data block, and operation S2110 is performed. If not, the process may wait until a valid synchronization header is found. For example, a synchronization header can be valid if it is equal to, for example, 4b'0010 or 4b'0001 as specified in the example of FIG. 6C. Otherwise, the synchronization header is invalid.

In operation S2110, it is determined whether the synchronization header indicates an ALE control block. If so, operation S2120 is executed to perform control PDU extraction and order restoring iteratively for a current PDU, for example, the first control PDU after the synchronization header bits or other control PDU. If not, operation S2140 is executed to perform data PDU extraction iteratively for a current PDU. For example, if the synchronization header is equal to, for example, 4b'0010 as specified in the example of FIG. 6C, it indicates that the subsequent PDUs following the synchronization header are associated with an ALE control block (or called the associated ALE block). If the synchronization header is equal to, for example, 4b'0001 as specified in the example of FIG. 6C, it indicates that the subsequent PDUs following the synchronization header are associated with an ALE data block (or called the associated ALE block).

After operation S2120, operation S2130 is performed to determine whether the current PDU is the last control PDU, for example, by checking whether the T tag of the current PDU indicates the last control PDU (e.g., if T equals 1). If it is the last control PDU (e.g., T equals 1), operation S2140 is executed to start data PDU extraction. If it is not the last control PDU (e.g., T equals 0), operation S2120 is executed again for the next control PDU until the last control PDU is processed.

In operation S2140, the data PDU extraction is performed iteratively for a data PDU. After operation S2140, operation S2150 is performed to determine whether a specific number N of PDUs (e.g., N=8) for the associated ALE block have been processed. If not, operation S2140 is repeated for a next data PDU. If a specific number N of PDUs have been processed, operation S2160 is performed to pass the processed PDUs to the subsequent stages, for example, DL receiver or PACP receiver (RX), through the lane assembling module 1020 and a frame de-interleaving module 1030.

In an example, the control PDU extraction and order restoring in operation S2120 and the data PDU extraction in operation S2140 can be implemented according to a piece of pseudo code of hardware description language described in TABLE 3.

TABLE 3

| Pseudo code for control PDU order restoring | comments |
| --- | --- |
| MODULE ctrl_PDU_order_restoring | If new PDU is CTRL PDU, then |
| INITIALIZE rx_space as data array of 8 words | perform order |
| // 1 word = 16 bits; | restoring. |
| // if CTRL PDU -> Restore | |
| if ( new PDU is CTRL PDU) | |

TABLE 3-continued

```
begin
    if (new PDU's POS == 7) then
        restore CTRL PDU in rx_space[7];
    else if (new PDU's POS == 6) then
        restore CTRL PDU in rx_space[6];
    else if (new PDU's POS == 5) then
        restore CTRL PDU in rx_space[5];
    else if (new PDU's POS == 4) then
        restore CTRL PDU in rx_space[4];
    else if (new PDU's POS == 3) then
        restore CTRL PDU in rx_space[3];
    else if (new PDU's POS == 2) then
        restore CTRL PDU in rx_space[2];
    else if (new PDU's POS == 1) then
        restore CTRL PDU in rx_space[1];
    else
    // new PDU's POS == 0
        restore CTRL PDU in rx_space[0];
    end
    else                                      If new PDU is
    // New PDU is DATA PDU -> find a rx_space  DATA PDU, then
    and store begin                           store it.
        if (rx_space[0] is not occupied) then
            put DATA PDU in rx_space[0];
        else if (rx_space[1] is not occupied) then
            put DATA PDU in rx_space[1];
        else if (rx_space[2] is not occupied) then
            put DATA PDU in rx_space[2];
        else if (rx_space[3] is not occupied) then
            put DATA PDU in rx_space[3];
        else if (rx_space[4] is not occupied) then
            put DATA PDU in rx_space [4];
        else if (rx_space[5] is not occupied) then
            put DATA PDU in rx_space[5];
        else if (rx_space[6] is not occupied) then
            put DATA PDU in rx_space[6];
        else // because only rx_space[7] is available
            put DATA PDU in rx_space[7];
    end
end MODULE
```

The block extractor (e.g., 1007 or 1017) can be implemented by circuitry according to the process of FIG. 12 and the pseudo code for control block reordering of TABLE 3. In an embodiment, the block extractor includes a logic circuit for executing a process according to the process of FIG. 12, a circuit module according to TABLE 3 (e.g., realizing MODULE ctrl_PDU_order_restoring), and a data buffer for providing a memory region for temporarily storing PDUs during a round of processing. For example, a data array (e.g., denoted by rx_space) of 8 words (each word of 16 bits) which can be referred to as rx_space[0] to rx_space [7] as described in TABLE 3, is used for storing 8 PDUs for an ALE block. In addition, flags or registers may also be used for recording or checking whether a rx_space is valid or occupied in practice.

The control PDU extraction and order restoring in operation S2120 and the data PDU extraction in operation S2140, as exemplified in TABLE 3, are substantially the reverse operations of the control block reordering, exemplified in TABLE 2. As described in TABLE 3, for a current PDU (i.e., a new PDU) which is a control PDU, the POS field (e.g., 0, 1, 2 . . . , 7) of the current PDU is examined and the current PDU is restored in a position of the data array according to the value of the POS field. For example, a current PDU with its POS field equal to 7 is stored in rx_space[7] and a current PDU with its POS field equal to 6 is stored in rx_space[6] and so on. As described in TABLE 3, after the restoring of all control PDU(s) for the associated ALE block, it is to find the data array's available element which is not occupied by the restored control PDU and store a current data PDU in the available element. In an example where rx_space[1], rx_space[4], and rx_space[6] of the data array rx_space have been occupied by respective control PDUs, the available elements of the data array are rx_space[0], rx_space[2], rx_space[3], rx_space[5], and rx_space[7], a series of 5 data PDUs will be stored in these available elements (i.e., memory space) iteratively. In this example, the operations according to TABLE 3 are substantially the reverse operations of those illustrated in FIG. 6C for translating the ALE control block CB to the associated ALE block ALE_B1. On the other hand, for an ALE data block (e.g., DB), the operations according to TABLE 3 are substantially the reverse operations of those illustrated in FIG. 6C for translating the ALE data block DB to the associated ALE block ALE_B2.

In practice, the process as described in TABLE 2 or TABLE 3 can be implemented by digital circuits, such as pipelined circuits. Thus, these operations can be done on-the-fly (e.g., a clock cycle) without latency impact.

In addition, in some embodiments, the circuit architecture as illustrated in FIG. 9 or 11 can be implemented by pipelined circuitry, wherein the functional circuit blocks (such as block generators (block extractors) and so on) can be realized by using respective pipelined circuits electronically coupled by a data channel of a specific width (e.g., 80 bits or 160 bits and so on). The effectiveness and efficiency of the processing of the circuit according to FIG. 9 or 11 can be enhanced accordingly.

Further, in the implementation of the interconnection protocol capable of performing an advanced line coding scheme as in one of the above embodiments or examples, at least one ordered set can be adopted to resolve the issue of symbol alignment (or block alignment) and symbol lock operation (or block lock operation). In a mode of advanced line coding for a communication system such as the storage system 1, K-Code, e.g., Deskew (<MK0, MK1>), used for data alignment as required by the current UniPro for the UFS standard, is not used.

For example, in a communication system such as the storage system 1, an ordered set pattern is implemented for symbol alignment and symbol lock operations. The ordered set pattern includes a first ordered set and a second ordered set. The first ordered set is referred to as a skip ordered set (SKP OS) and the second ordered set is referred to as a start data string ordered set (SDS OS), as illustrated in TABLE 4.

TABLE 4

| Ordered sets | Expanded in binary (they are transmitted to the receiver side without being scrambled) |
|---|---|
| SKP OS = { {16{8'h99} } | {16 {10011001}}<br>(the code of {10011001} is repeated for 16 times) |
| SDS OS = {4 {8'hB1, {3{8'hC6}}} } | {4 {10110001, {3{11000110}}}}<br>(the code in the first pair of {10110001, {3{11000110}}} is repeated for 4 times) |

For communication of the host and the device through the interconnect protocol capable of performing an advanced line coding scheme (e.g., 128b/130b or 128b/132b coding or so on), the ordered set pattern can be inserted, for example, before ALE control or data blocks are transmitted in a burst transmission. The ordered set pattern is transmitted over the link between the host and device using the advanced line coding without being scrambled. The data pattern of the ordered set pattern is unique for receiver side detection. In the PA layer transmitter (e.g., 900 in FIG. 9), ALE control or data blocks are transmitted to the receiver side after the ordered set pattern, wherein the ALE control or data blocks may be generated according to DL frames or PACP frames, in the frame structure as exemplified in the embodiments of FIG. 4A-4C or 5A-5D, and according to the process of FIG. 10. When the PA layer receiver (e.g., 1000 in FIG. 11) detects the ordered set pattern, the PA layer receiver is capable of determining block boundary with respect to a synchronization header of an ALE control or data block received. The block extraction for an ALE control or data block can be performed efficiently and effectively according to the process of FIG. 12 with respect to the ALE control or data block structure as exemplified in the embodiments of FIG. 4A-4C or 5A-5D. In this manner, the implementations of the modified PA layer and modified M-PHY capable of performing the ALE are hidden from the data link layer. Accordingly, in some embodiments, the interconnection protocol with the ALE is derived from the current UFS standard, or UniPro specification, the functionality of the data link layer (or even the upper layers) according to the UniPro specification can be maintained or maintained as much as possible. Thus, the new frame structure as proposed facilitates the implementation of the interconnection protocol capable of performing the ALE. The PHY adapter layer SAP model for ALE as illustrated in FIG. 1 and the related embodiments above facilitate the implementation of the interconnection protocol with the ALE and simplifies its implementation complexity.

Embodiments of an operation method for an electronic device (such as a host or storage device in FIG. 1, 7A-7C, or 8; or related examples above) are provided. The electronic device is operable to communicate with another electronic device according to an interconnection protocol, as exemplified in one of the embodiments above. The operation method comprises the following. At a controller (such as a controller for the host or storage device; or the like illustrated in FIG. 1, 7A-7C, or 8; or related examples above) of the electronic device, a specific number (e.g., 8 as illustrated in FIG. 6B or related examples above) of protocol data units (PDUs) are received as a PDU block to be transmitted by using an advanced line encoding (e.g., 128b/130b, 128b/132b line encoding or so on) having an improved effective data rate as compared to 8b/10b encoding, wherein the PDU block includes at least one PDU belonging to a control PDU category. At the controller, a control block (e.g., an ALE control block as illustrated in FIG. 6B, 6C, or related examples above) is generated according to the PDU block by reordering the PDUs of the PDU block (e.g., as illustrated in FIG. 6B, 6C, 9, 10, TABLE 2, or related examples above), wherein the control block includes a header being placed before all PDUs of the PDU block and indicating a control block category; the PDUs of the PDU block are reordered such that in the control block, any PDU belonging to the control PDU category in the PDU block is placed after the header and is placed before any PDU belonging to a data PDU category in the PDU block. The control block is transmitted through the electronic device to the another electronic device according to the advanced line encoding.

Embodiments of an electronic device (such as a host or storage device in FIG. 1, 7A-7C, or 8; or related examples above) are provided. The electronic device is operable to communicate with another electronic device according to an interconnection protocol, as exemplified in one of the embodiments above. The electronic device comprises a controller (such as a controller for the host or storage device; or the like illustrated in FIG. 1, 7A-7C, or 8; or related examples above) and an interface circuit (such as the host interface 11 or device interface 21). The controller is capable of receiving a specific number of protocol data units (PDUs) as a PDU block to be transmitted by using an advanced line encoding having an improved effective data rate as compared to 8b/10b encoding, wherein the PDU block includes at least one PDU belonging to a control PDU category. The controller is capable of generating a control block (e.g., an ALE control block as illustrated in FIG. 6B, 6C or related examples above) according to the PDU block, wherein the control block includes a header being placed before all PDUs of the PDU block and indicating a control block category. The controller is capable of reordering the PDUs of the PDU block in generation of the control block (e.g., as illustrated in FIG. 6B, 6C, 9, 10, TABLE 2, or related examples above) such that in the control block, any PDU belonging to the control PDU category in the PDU block is placed after the header and is placed before any PDU belonging to a data PDU category in the PDU block. The interface circuit is capable of transmitting the control block to the another electronic device according to the advanced line encoding.

In some embodiments of the operation method or the electronic device, the advanced line encoding is based on a 128b/130b line encoding or 128b/132b line encoding. The advanced line encoding may also be based on 128b/131b, 128b/133b line encoding and so on; or 256b/258b, 256b/260b and so on.

In some embodiments of the operation method or the electronic device, the PDU block has a PDU belonging to the control PDU category obtained by conversion of a control symbol from a data link layer of the electronic device, as illustrated in FIG. 4A, 5A, 5B, 5C or related examples above.

In some embodiments of the operation method or the electronic device, the control symbol from the data link layer of the electronic device is a data link layer control symbol according to a Unified Protocol (UniPro).

In some embodiments of the operation method or the electronic device, the PDU block has a PDU belonging to the control PDU category obtained by conversion of a control symbol of a physical adapter layer of the electronic device, as illustrated in FIG. 4B, 5D or related examples above.

In some embodiments of the operation method or the electronic device, the control symbol of the physical adapter layer of the electronic device is a physical adapter control protocol (PACP) control symbol according to a Unified Protocol (UniPro).

In some embodiments of the operation method or the electronic device, a PDU belonging to the control PDU category in the PDU block includes a position field indicating a position of the PDU in the PDU block, as illustrated in FIG. 4A, 4B, 5A-5D, 6B, 6C, or related examples above.

In some embodiments of the operation method or the electronic device, a PDU (e.g., referred to as a first control PDU) belonging to the control PDU category in the PDU block includes a link list field indicating whether there is another PDU (e.g., referred to as a second control PDU) belonging to the control PDU category in the PDU block and being placed after the PDU (e.g., the first control PDU) in the control block, as illustrated in FIG. 4A, 4B, 5A-5D, 6B, 6C, or related examples above.

In some embodiments of the operation method or the electronic device, the controller is capable of receiving a specific number of another PDUs as another PDU block to be transmitted by using the advanced line encoding, wherein all PDUs of the another PDU block belong to the data PDU category (e.g., as illustrated in FIG. 6A, 6C, or related examples above); the controller is capable of generating a data block according to the another PDU block, wherein the data block includes a header and all PDUs of the another PDU block (e.g., as illustrated in FIG. 6A, 6C, or related examples above), the header of the data block is placed before all PDUs of the another PDU block and indicates a data block category, and the interface circuit is capable of transmitting the data block to the another electronic device according to the advanced line encoding.

In some embodiments of the operation method or the electronic device, the controller is capable of transmitting at least one ordered set to the another electronic device to start a burst transmission, wherein the controller transmits the control block after starting the burst transmission.

Moreover, in the present disclosure, "asserting" a signal (or other alternative forms such as "asserted" or "assertion") means that a signal is set to be in an active state (or an active voltage level), which may be a high or low level. "De-asserting" a signal (or other alternative forms such as "de-asserted" or "de-assertion") means that a signal is set to be in an inactive state (or an inactive voltage level), which may be a high or low level. If a signal is set to be at a low level to represent active-low, "asserting" the signal means that the signal is set to a low level, and "de-asserting" the signal means that the signal is set to a high level. If a signal is set to be at a high level to represent active-high, "asserting" a signal means that the signal is set to a high level, and "de-asserting" the signal means that the signal is set to a low level.

Moreover, in the embodiments related to the host and the storage device above, the hardware protocol engine in the host controller or the device controller can be designed based on Hardware Description Language (HDL) such as Verilog or techniques of any other design methods of digital circuits generally known to a person skilled in the art, and can be implemented by one or more of circuits based on such as a field programmable gate array (FPGA), an application-specific integrated circuit (ASIC), or a complex program-mable logic device (CPLD), or be implemented by a dedi-cated circuit or module. The host controller or the device controller (or a processing unit or a hardware protocol engine therein) can also be based on a microcontroller, a processor, or a digital signal processor (DSP).

As described above, various embodiments of a method for an interconnection protocol capable of performing an advanced line coding, a controller, and an electronic device (such as a host or a storage device) are provided.

The present disclosure is described by using the multiple embodiments above. A person skilled in the art should understand that, these embodiments are merely for describing the present disclosure are not to be construed as limi-tations to the scope of the present disclosure. It should be noted that all equivalent changes, replacements and substi-tutions made to the embodiments are to be encompassed within the scope of the present disclosure. Therefore, the scope of protection of the present disclosure should be accorded with the broadest interpretation of the appended claims.

What is claimed is:

1. An operation method for an electronic device, operable to communicate with another electronic device according to an interconnection protocol, the operation method compris-ing:

at a controller of the electronic device, receiving a specific number of protocol data units (PDUs) as a PDU block to be transmitted by using an advanced line encoding having an improved effective data rate as compared to 8b/10b encoding, wherein the PDU block includes at least one PDU belonging to a control PDU category;

generating, at the controller, a control block according to the PDU block by reordering the PDUs of the PDU block, wherein the control block includes a header being placed before all PDUs of the PDU block and indicating a control block category; the PDUs of the PDU block are reordered such that in the control block, any PDU belonging to the control PDU category in the PDU block is placed after the header and is placed before any PDU belonging to a data PDU category in the PDU block; and transmitting the control block through the electronic device to the another electronic device according to the advanced line encoding.

2. The operation method according to claim 1, wherein the advanced line encoding is based on a 128b/130b line encod-ing, 128b/132b line encoding, 256b/258b line encoding, or 256b/260b line encoding.

3. The operation method according to claim 1, wherein the PDU block has a PDU belonging to the control PDU category obtained by conversion of a control symbol from a data link layer of the electronic device.

4. The operation method according to claim 3, wherein the control symbol from the data link layer of the electronic device is a data link layer control symbol according to a Unified Protocol (UniPro).

5. The operation method according to claim 1, wherein the PDU block has a PDU belonging to the control PDU category obtained by conversion of a control symbol of a physical adapter layer of the electronic device.

6. The operation method according to claim 5, wherein the control symbol of the physical adapter layer of the electronic device is a physical adapter control protocol (PACP) control symbol according to a Unified Protocol (UniPro).

7. The operation method according to claim 1, wherein a PDU belonging to the control PDU category in the PDU block includes a position field indicating a position of the PDU in the PDU block.

8. The operation method according to claim 1, wherein a first PDU belonging to the control PDU category in the PDU block includes a link list field indicating whether there is a second PDU belonging to the control PDU category in the PDU block and being placed after the first PDU in the control block.

9. The operation method according to claim 1, wherein receiving, at the controller, a specific number of another PDUs as another PDU block to be transmitted by using the advanced line encoding, wherein all PDUs of the another PDU block belong to the data PDU category;

generating, at the controller, a data block according to the another PDU block, wherein the data block includes a header and all PDUs of the another PDU block, the header of the data block is placed before all PDUs of the another PDU block and indicates a data block category; and transmitting the data block through the electronic device to the another electronic device according to the advanced line encoding.

10. The operation method according to claim 1, further comprising:

starting a burst transmission by transmitting at least one ordered set to the another electronic device, wherein the control block is transmitted after the burst transmission is started.

11. An electronic device, operable to communicate with another electronic device according to an interconnection protocol, the electronic device comprising:

a controller capable of receiving a specific number of protocol data units (PDUs) as a PDU block to be transmitted by using an advanced line encoding having an improved effective data rate as compared to 8b/10b encoding, wherein the PDU block includes at least one PDU belonging to a control PDU category, and the controller is capable of generating a control block according to the PDU block, wherein the control block includes a header being placed before all PDUs of the PDU block and indicating a control block category; the controller is capable of reordering the PDUs of the PDU block in generation of the control block such that in the control block, any PDU belonging to the control PDU category in the PDU block is placed after the header and is placed before any PDU belonging to a data PDU category in the PDU block; and an interface circuit capable of transmitting the control block to the another electronic device according to the advanced line encoding.

12. The electronic device according to claim 11, wherein the advanced line encoding is based on a 128b/130b line encoding, 128b/132b line encoding, 256b/258b line encoding, or 256b/260b line encoding.

13. The electronic device according to claim 11, wherein the PDU block has a PDU belonging to the control PDU category obtained by conversion of a control symbol from a data link layer of the electronic device.

14. The electronic device according to claim 13, wherein the control symbol from the data link layer of the electronic device is a data link layer control symbol according to a Unified Protocol (UniPro).

15. The electronic device according to claim 11, wherein the PDU block has a PDU belonging to the control PDU category obtained by conversion of a control symbol of a physical adapter layer of the electronic device.

16. The electronic device according to claim 15, wherein the control symbol of the physical adapter layer of the electronic device is a physical adapter control protocol (PACP) control symbol according to a Unified Protocol (UniPro).

17. The electronic device according to claim 11, wherein a PDU belonging to the control PDU category in the PDU block includes a position field indicating a position of the PDU in the PDU block.

18. The electronic device according to claim 11, wherein a first PDU belonging to the control PDU category in the PDU block includes a link list field indicating whether there is a second PDU belonging to the control PDU category in the PDU block and being placed after the first PDU in the control block.

19. The electronic device according to claim 11, wherein the controller is capable of receiving a specific number of another PDUs as another PDU block to be transmitted by using the advanced line encoding, wherein all PDUs of the another PDU block belong to the data PDU category; the controller is capable of generating a data block according to the another PDU block, wherein the data block includes a header and all PDUs of the another PDU block, the header of the data block is placed before all PDUs of the another PDU block and indicates a data block category, wherein the interface circuit is capable of transmitting the data block to the another electronic device according to the advanced line encoding.

20. The electronic device according to claim 11, wherein the controller is capable of transmitting at least one ordered set to the another electronic device to start a burst transmission, wherein the controller transmits the control block after starting the burst transmission.

* * * * *